United States Patent [19]

Endoh et al.

[11] Patent Number: 5,378,436
[45] Date of Patent: Jan. 3, 1995

[54] METHOD AND APPARATUS FOR PRODUCING HYDROGEN PEROXIDE

[75] Inventors: Shinji Endoh; Keisuke Namba; Shigenori Yagi; Kazuhiko Maeda, all of Hyogo, Japan

[73] Assignee: Mitsubishi Denki Kabushiki Kaisha, Tokyo, Japan

[21] Appl. No.: 658,030

[22] Filed: Feb. 22, 1991

[30] Foreign Application Priority Data

| Mar. 6, 1990 | [JP] | Japan | 2-55619 |
| May 10, 1990 | [JP] | Japan | 2-121556 |
| May 10, 1990 | [JP] | Japan | 2-121557 |
| May 11, 1990 | [JP] | Japan | 2-122464 |
| May 14, 1990 | [JP] | Japan | 2-125148 |
| May 15, 1990 | [JP] | Japan | 2-126034 |
| May 15, 1990 | [JP] | Japan | 2-126035 |
| May 15, 1990 | [JP] | Japan | 2-126036 |
| Jun. 5, 1990 | [JP] | Japan | 2-148199 |
| Nov. 20, 1990 | [JP] | Japan | 2-314516 |

[51] Int. Cl.$^6$ .................. B01J 19/08; B01D 5/00; C01B 15/01
[52] U.S. Cl. .................. 422/186; 422/186.04; 204/157.21; 204/157.49; 204/175
[58] Field of Search .................. 422/186, 186.04; 204/157.21, 157.44, 175

[56] References Cited

U.S. PATENT DOCUMENTS

| 1,890,793 | 12/1932 | Noack et al. | 204/31 |
| 2,015,040 | 9/1935 | Piptzsch | 422/186.04 |
| 2,022,650 | 12/1935 | Dawsey | 204/31 |
| 2,162,996 | 6/1939 | Dawsey | 204/31 |
| 2,163,898 | 6/1939 | van der Zaner | 23/207 |
| 3,968,273 | 7/1976 | Kastening et al. | 427/122 |
| 4,113,589 | 9/1978 | Leach | 204/157.1 R |
| 5,112,702 | 5/1992 | Berzins et al. | 429/17 |

FOREIGN PATENT DOCUMENTS

| 229573 | 12/1910 | Germany . |
| 630905 | 6/1936 | Germany . |
| 2519644 | 11/1976 | Germany . |

OTHER PUBLICATIONS

"Anzen Kogaku", vol. 1, No. 2, pp. 100–108.

Primary Examiner—Donald P. Walsh
Assistant Examiner—Daniel Jenkins
Attorney, Agent, or Firm—Lowe, Price, LeBlanc & Becker

[57] ABSTRACT

A method for producing hydrogen peroxide by electrical discharge in a material gas in which oxygen concentration is not less than 0.5% and less than 13% is disclosed in the first aspect. In the second aspect, an apparatus for producing hydrogen peroxide having a plurality of electrical discharge chambers connected in series is disclosed. In the third aspect, an apparatus in which a material gas is recycled is disclosed. In the forth aspect, an apparatus having its electrodes covered with dielectric and an electrical discharge chamber which is cooled by a cooling member. In the fifth aspect, a method for producing hydrogen peroxide having a step of inactivating radical species produced by electrical discharges is disclosed. In the sixth aspect, an apparatus having a condensation tube coated with resin with low reactivity with hydrogen peroxide is disclosed. In the seventh aspect, an apparatus for, after producing hydrogen peroxide, mixing the exhaust gas and the air in order to remove danger of explosion is disclosed. A method and an apparatus for producing hydrogen peroxide in accordance with the present invention produces hydrogen peroxide safely and efficiently.

19 Claims, 14 Drawing Sheets

METHOD AND APPARATUS FOR PRODUCING HYDROGEN PEROXIDE

BACKGROUND OF THE INVENTION

1. Field of the Invention

The present invention relates to methods and apparatus for producing hydrogen peroxide, and more particularly to producing methods and producing apparatus of hydrogen peroxide gas and aqueous solution of hydrogen peroxide applicable to resist ashing, precision cleaning of surfaces, etching and surface reforming in processes of manufacturing semiconductor and electronic devices.

2. Description of the Background Art

It is well known to produce hydrogen peroxide by means of electrical discharge in a material gas containing oxygen and hydrogen. When producing hydrogen peroxide by means of electrical discharge, it is essential to prevent explosion of the material gas. Accordingly, the concentration of oxygen contained in the material gas should be limited to the explosion limit. In conventional cases, U.S. Pat. No. 1,890,793 is pointed out as a reported example suggesting concentration of oxygen. This patent suggests a value of 3% as the oxygen concentration in the material gas. Also, the lowest limit value of the oxygen concentration related to combustion of a hydrogen-oxygen mixed gas is generally regarded as 4-6%, although it depends on structures of combustion devices and the like. If the oxygen concentration close to this value is implemented, it is supposed that ignition or explosion may occur due to just a small malfunction of a material gas supply system. Therefore, the oxygen concentration in material gas should be limited to a low value in a range of no disadvantages in production of hydrogen peroxide.

"Silent Discharge and Chemical Reaction (III) (MUSEI HODEN TO KAGAKU HANNOU)" *DENKI KAGAKU*, Vol. 25, p. 100 reports an apparatus for producing hydrogen peroxide by silent discharge in material gas containing oxygen and hydrogen. FIG. 1 schematically shows the apparatus. Referring to FIG. 1, a gas containing oxygen and hydrogen is supplied from a material gas source 51 to a portion between electrodes 53 and 54 in a silent discharge chamber 52. An AC high-voltage is applied to the two electrodes 53, 54 in silent discharge chamber 52 from a power source 56 to produce silent discharge between the electrodes. The silent discharge have hydrogen molecules dissociated due to collision of electrons to produce hydrogen atoms. The hydrogen atoms react with oxygen molecules to produce hydrogen peroxide and water as a by-product. The hydrogen peroxide and water are taken out from silent discharge chamber 52.

FIG. 2 is a sectional view showing a structure of a conventional discharge chamber 52 employed in FIGS. 1. Referring to FIG. 2, tubular high voltage electrode 59 is provided in close contact with the inner surface of a glass tube 60 which is a dielectric. Outside glass tube 60, a tubular ground side electrode 58 is provided having a larger radius than that of the glass tube. Outside ground side electrode 58, a tubular metallic chamber 61 is formed integrally with electrode 58. By circulating cooling water between metallic chamber 61 and electrode 58, electrode 58 is cooled.

Operation of the above-mentioned apparatus will be described below. A gas containing oxygen and hydrogen is supplied between the two electrodes in silent discharge chamber 52 from material gas supplying source 51. Application of an AC high-voltage from power source 56 to the two electrodes 58 and 59 in electrical discharge chamber 52 causes electrical discharge in the electrode tube. With dissociation of hydrogen molecules due to collision of electrons in electrical discharge chamber 52, hydrogen atoms are produced. As the result of reaction of hydrogen atoms and oxygen molecules, hydrogen peroxide is produced. Water vapor of a quantity equal to or smaller than that of the hydrogen peroxide is also produced simultaneously. The hydrogen peroxide and water vapor produced in this way are taken out from silent discharge chamber 52 together with the hydrogen and oxygen. When employing hydrogen peroxide in the form of aqueous solution, a large part of the hydrogen peroxide and a part of the water can be condensed and separated by cooling the mixture gas exhausted from silent discharge chamber 52 with a condenser, for example. The separated liquid is used as a aqueous hydrogen peroxide solution. The interior of the condenser (not shown) is configured as a duplex tube as an example, where a mixed gas is passed through between the interior tube and the exterior tube, and cooling brine is passed in the interior tube. By cooling the mixed gas, a large part of the hydrogen peroxide and a part of the water vapor in the mixed gas are condensed and separated.

A mixed gas of oxygen and hydrogen is well known as typical example of a gas carrying a risk of explosion. In a hydrogen-oxygen mixed gas, the range of oxygen concentration of danger of explosion is affected by a lot of factors such as a transmitting direction of a fire, pressure of the gas and the like. It is shown in a literature (*ANZEN KOGAKU*, Vol. 1, No. 2, p.p. 100–108), however, that the oxygen concentration is approximately 4–94 vol%, for example. Accordingly, the oxygen concentration in a material gas is limited to about 4% or less in order to prevent the risk of explosion and ignition, and a considerable decrease of a yield of hydrogen peroxide due to ozone mainly produced when the oxygen concentration becomes high. The results of component analysis of the gas exhausted from an electrical discharge chamber by the inventors et al. showed that, as the oxygen is first used up to produce hydrogen peroxide and finally no oxygen exists in the electrical discharge place, the production of hydrogen peroxide decreases as shown in FIG. 3, and finally the production of hydrogen peroxide comes to 0. Therefore, when a conventional apparatus is used, the amount of power supply in electrical discharge should be limited so that the oxygen concentration in the material gas does not decrease. On the other hand, a large amount of hydrogen which is not employed for reaction are exhausted out of the system in vain. When a mixed gas containing 3% of oxygen and 97% of hydrogen is employed as a material gas, the final oxygen concentration must be maintained 1.3% or more in order to obtain high yield of hydrogen peroxide. In this case, while the utilization factor of oxygen is as high as 56%, the utilization factor of the hydrogen which is a main component of the material gas is only 1.4%. Accordingly, the cost of the material gas in manufacturing hydrogen peroxide further increases. Also, power supply is limited in order to prevent a decrease in oxygen concentration in the material gas which reduces efficiency of production of hydrogen peroxide by electrical discharge, so that very high concentration of hydrogen peroxide can not be obtained.

In the method of producing hydrogen peroxide by subjecting hydrogen-oxygen mixture to electrical discharge, as described above, it is necessary to restrain the oxygen concentration in the material gas in a range causing no disadvantage in production of hydrogen peroxide and also to reduce as much as possible the amount of useless oxygen in order to prevent explosion and cause reaction without danger. Regardless of the fact, there is no reported examples suggesting appropriate oxygen concentrations from such point of view.

The above-described conventional apparatus for producing hydrogen peroxide has some disadvantages including that the utilization factor of material hydrogen is low, and hydrogen peroxide of high concentration can not be obtained. Such disadvantages are due to the fact that the oxygen concentration supplied in a discharge space is limited because of danger of explosion and ignition.

In conventional apparatus for producing hydrogen peroxide, impurity particles produced in collision of electrons against an electrode in an electric discharge space contaminated the produced hydrogen peroxide gas. In the meantime, the material gas is usually supplied from a gas cylinder. As for the gas filled in a gas cylinder, although its cleanliness is sufficiently controlled, contamination of particles of metal oxide into the gas from a surface in the gas cylinder can often occur. If the impurity particles are condensed in an end product, a big problem can arise in use of the product.

In the same way, in a conventional silent discharge apparatus, there has been a fear that produced hydrogen peroxide gas or separated hydrogen peroxide solution is contaminated with oxides and ions of components configuring a metal electrode. Such impurities could be a cause of forming a defective pattern in a process of manufacturing highly-integrated semiconductor devices. Also, the impurities could cause a decrease of the yield in manufacturing devices. On the other hand, in order to efficiently produce hydrogen peroxide, cooling of an electrical discharge chamber is extremely important. Since an electrode on a ground side only has been cooled in a conventional apparatus, the yield of hydrogen peroxide could not be expected to be further enhanced.

In a conventional method of manufacturing hydrogen peroxide, no measure has been taken against radical species produced by electrical discharge which are transported with the flow of material gas to react with materials forming the manufacturing device.

SUMMARY OF THE INVENTION

It is an object of the present invention to provide a method capable of producing hydrogen peroxide safely and efficiently while preventing explosion.

It is another object of the present invention to provide an apparatus for producing hydrogen peroxide capable of safely enhancing the utilization factor of material hydrogen and also producing hydrogen peroxide of relatively high concentration.

It is still another object of the present invention to provide an apparatus for producing hydrogen peroxide capable of preventing impurity contamination into produced hydrogen peroxide solution.

It is yet another object of the present invention to provide an apparatus for producing hydrogen peroxide capable of enhancing utilization factor of material gas by recycling material gas.

It is still another object of the present invention to provide an apparatus for producing hydrogen peroxide in which hydrogen peroxide is produced by electrical discharge with higher efficiency.

It is a further object of the present invention to provide a method in which hydrogen peroxide can be taken out after radical species produced by electrical discharge are sufficiently reduced.

It is yet another object of the present invention to provide an apparatus for producing hydrogen peroxide capable of condensing produced hydrogen peroxide efficiently and safely into a aqueous solution for separation.

It is still another object of the present invention to provide an apparatus for safely exhausting exhaust gas produced in production of hydrogen peroxide.

In the first aspect, the present invention provides a method of producing hydrogen peroxide including the steps of mixing a gas containing hydrogen and a gas containing oxygen so that the concentration of oxygen is not less than 0.5% and less than 3%, and producing hydrogen peroxide by subjecting the mixed gas to electrical discharge. By setting the oxygen concentration in the material gas in a range of not less than 0.5% and less than 3%, wasteful consumption of oxygen can be prevented in reaction for producing hydrogen peroxide. Also, since the oxygen concentration is limited to a low value in this range causing no problem in producing hydrogen peroxide, hydrogen peroxide can be safely produced without danger of explosion.

In the second aspect, the present invention provides an apparatus for producing hydrogen peroxide from a material gas containing hydrogen and oxygen including a first electrical discharge chamber provided with the material gas for producing hydrogen peroxide from the material gas by electrical discharge, a second discharge chamber provided with the gas exhausted from the first discharge chamber for producing hydrogen peroxide by electrical discharge, and an oxygen supplying device for supplying oxygen to the gas exhausted from the first discharge chamber to introduce it to the second discharge chamber. The apparatus may include an oxygen detector for detecting oxygen concentration in the gas exhausted from the first discharge chamber and a controller for controlling an oxygen supply amount from the oxygen supplying device according to information of the oxygen detector. In this apparatus, oxygen is supplied to the gas containing hydrogen peroxide exhausted from the first discharge chamber and it is introduced into the second discharge chamber, and then hydrogen peroxide is further produced by electrical discharge in the second discharge chamber. A part of hydrogen which was not consumed by the first discharge reacts with supplied oxygen in the second discharge chamber. In this way, the hydrogen supplied as raw material is efficiently utilized. Since hydrogen peroxide produced in a plurality times of discharge is accumulated, the concentration of hydrogen peroxide finally obtained can be high.

In the third aspect, the present invention provides an apparatus for producing hydrogen peroxide from a material gas containing hydrogen and oxygen including a discharge chamber provided with material gas for producing hydrogen peroxide from the material gas by electrical discharge, a separator for separating hydrogen peroxide and water from the gas exhausted from the discharge chamber, a recycling device for recycling the gas exhausted from the separator to the discharge chamber, a hydrogen supplying device for supplying hydrogen to the recovered gas returned from the separator to the discharge chamber by the recycling device, and an oxygen supplying device for supplying oxygen to the recovered gas returned from the separator to the discharge chamber by the recycling device. This apparatus may further include an oxygen detector for detecting oxygen concentration of the recovered gas, a pressure detector for detecting pressure of the recovered gas, and one or more controllers for controlling an amount of hydrogen supply from the hydrogen supplying device and an amount of oxygen supply from the oxygen supplying device in accordance with information of the oxygen detector and the pressure detector. On the other hand, the apparatus for producing hydrogen peroxide in accordance with the present embodiment in the third aspect can include a hydrogen peroxide detector for detecting quantity of hydrogen peroxide separated by the separator and the controller for controlling the quantity of hydrogen supply from the hydrogen supplying device and an amount of oxygen supply from the oxygen supplying device in accordance with information of the hydrogen peroxide detector. The hydrogen peroxide detector may include, for example, a level gage for determining quantity of liquid containing hydrogen peroxide separated by the separator and an ultraviolet absorptiometer for determining the concentration of hydrogen peroxide in the liquid. Furthermore, the above-mentioned recycling device may be provided with a gas circulation blower. This apparatus can efficiently utilize a material gas by recycling the gas exhausted from the separator by the recycling device after separation of hydrogen peroxide and water by the separator. Providing other detectors to grasp the amounts of oxygen and hydrogen consumed by production of hydrogen peroxide and water vapor and a controller capable of supplying oxygen and hydrogen in accordance with the detected amounts enables safe and continuous production of hydrogen peroxide by electrical discharge in a material gas having a predetermined mixing ratio.

Furthermore, an apparatus for producing hydrogen peroxide in accordance with the present invention in the third aspect may be provided with a filter for removing impurity particles produced by discharge in the discharge chamber. This filter may include a filter for removing the impurity particles in the recovered gas and/or a filter for removing the impurity particles from hydrogen peroxide separated by the separator. The above filter prevent these impurity particles from contaminating hydrogen peroxide or aqueous solution of hydrogen peroxide produced as an end product. A gas filter having a bore diameter of 0.05–1.0 $\mu$m is one of the most desired filters. Furthermore, it is desired that such a filter is formed of resin which does not react with hydrogen peroxide because gas or solution passing through such a filter contains hydrogen peroxide, although the concentration has variations.

The apparatus in the third aspect of the present invention may be provided with a, filter for removing impurity particles from the hydrogen supplying device and a filter for removing impurity particles from the oxygen supplying device. Such filters prevent contamination of the recycling system, in which material gas circulates, by impurity particles from the material gas supply devices, e.g. particles of metallic oxide in the gas.

On the other hand, the recycling device of this invention in the third aspect may further include a second discharge chamber for converting oxygen in the gas exhausted from the separator into water, and a second separator for separating the water from the gas exhausted from the second discharge chamber. The apparatus provided with the second discharge chamber and the second separator may further include a pressure detecting device for detecting pressure of the gas returned from the second separating device to the preceding discharge chamber and a controlling device for controlling hydrogen supply amount from the hydrogen supplying device and oxygen supply amount from the oxygen supplying device. In this apparatus, the oxygen which was not reacted in the first discharge chamber is turned into water in the second discharge chamber and then removed as water from the second separator. Accordingly, when hydrogen and oxygen are employed as material gas, the gas recycled from the second separator is almost formed of hydrogen only. By recycling of hydrogen, the utilization factor of hydrogen supplied as raw material can be further increased. At the same time, since the recovered gas contains almost only hydrogen, information for controlling the amounts of oxygen and hydrogen to be supplied to the recovered gas can be obtained only by determining the pressure of the recovered gas by the pressure detector. With the controller working in accordance with the informations oxygen-hydrogen mixed gas having an appropriate concentration ratio is supplied to the discharge chamber. The appropriate mixing ratio further reduces the danger of explosion and ignition in producing hydrogen peroxide.

In the fourth aspect, the present invention provide an apparatus for producing hydrogen peroxide by electrical discharge from material gas containing hydrogen and oxygen including a pair of electrodes for producing discharge, a dielectric provided on opposing surfaces of the pair of electrodes, respectively, thermal conductive resin covering the pair of electrodes, and a metallic cooling member provided on the thermal conductive resin for cooling the pair of electrodes. In this apparatus, the opposing faces of the pair of electrodes are covered with the dielectric not to expose the electrodes in the discharge space. Accordingly, it is prevented that, from electrodes, particles of oxide of components thereof and metal ions are emitted by discharge. The electrodes are cooled by the metallic cooling member through the thermal conductive resin. The efficiency of producing hydrogen peroxide is improved by cooling. By cooling the metallic cooling member with water or a cooling agent, the electrodes are effectively cooled. The resin interposed between the cooling member and the electrodes prevents the gas passing between dielectrics from leaking outside through the cooling member and the cooling agent even if the dielectric is broken. This apparatus cools the electrodes safely and also produces hydrogen peroxide efficiently.

In the fifth aspect, the present invention provides a method of producing hydrogen peroxide by discharge in a material gas containing hydrogen and oxygen having the steps of producing discharge in the material gas, and staying the gas subjected to discharge for no less than 1 msec to inactivate radical species produced by the discharge. Taking out hydrogen peroxide after the step of staying the gas to inactivate the radical species produced by discharge, restrains reaction between the material forming the device for taking out hydrogen peroxide and the radical species to produce impurities. Also, it is prevented that impurities originated in the radical species contaminate the hydrogen peroxide or aqueous solution of hydrogen peroxide.

In the sixth aspect, the present invention provides an apparatus for producing hydrogen peroxide from a material gas containing hydrogen and oxygen having a discharge chamber provided with a material gas for producing hydrogen peroxide from a material gas by discharge, and a condensation tube for condensing hydrogen peroxide and water from a gas exhausted from the discharge chamber which is covered with a resin film having low reactivity with respect to hydrogen peroxide. The resin film may be substantially formed of tetrafluoroethylene. The condensation tube is protected from erosion by hydrogen peroxide by covered with the resin film.

In the seventh aspect, the present invention provides an apparatus for treating gas exhausted out of the system after producing hydrogen peroxide by discharge from a mixed gas containing hydrogen and oxygen including a mixing chamber for mixing exhausted gas and the air and a device for supplying the air to the mixing chamber. With this apparatus for treating the exhausted gas, hydrogen accounting for a large part of the exhausted gas is immediately diluted with the air to concentration of no danger of explosion. In this way, the risk of explosion is easily eliminated from the exhaust gas.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the first aspect, with our experiments for producing hydrogen peroxide by electrical discharge and our simulations of reaction for producing hydrogen peroxide in a hydrogen-oxygen mixed gas, we tried to find out conditions for safe and efficient production of hydrogen peroxide.

In the experiments, a silent discharge apparatus (the discharge area=435 cm$^2$, the gap length=0.19 cm) employing a pair of coaxial cylindrical glass tubes as dielectrics was used. As a material gas, a hydrogen-oxygen mixed gas was used. The mixed gas is passed through an electric discharge tube at a flow rate of 6$l$/min. The electric power source frequency was in a range of 500–3000 Hz, and the electric discharge output was in a range of 10–130W. The range of the ratio of the electric discharge current versus flow rate (W/Q$_N$) was approximately 2–20 Wmin/$l$, which was a practical value in operation of the apparatus. The temperature of the water for cooling electrodes was maintained at 300K, and the pressure of the gas was maintained at 797 Torr.

In the simulation of reaction, six electron collision reactions and forty nine chemical reactions in the oxygen-hydrogen system were taken into consideration. In the chemical reactions, as chemical species, the following are included; $H_2O_2$, $H_2O$, $O_3$, $H$, $HO_2$, $HO$, $O(^1D)$, $O(^3P)$, $O_2(a^1\Delta g)$, $O_2(b^1\Sigma g)$, $H_2$, $O_2$. Rate equations for the respective chemical species were solved.

The experiments and the simulations of reaction showed the following results.

Figure 1:
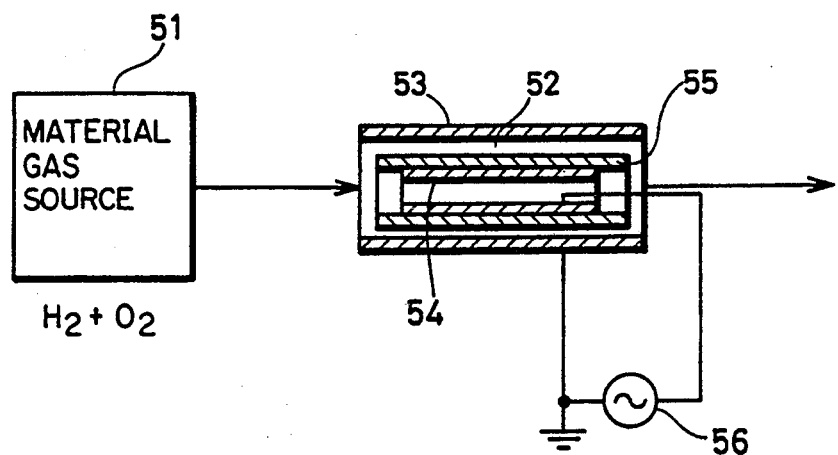
FIG. 1 is a conceptional diagram of a conventional apparatus for producing hydrogen peroxide.
Figure 2:
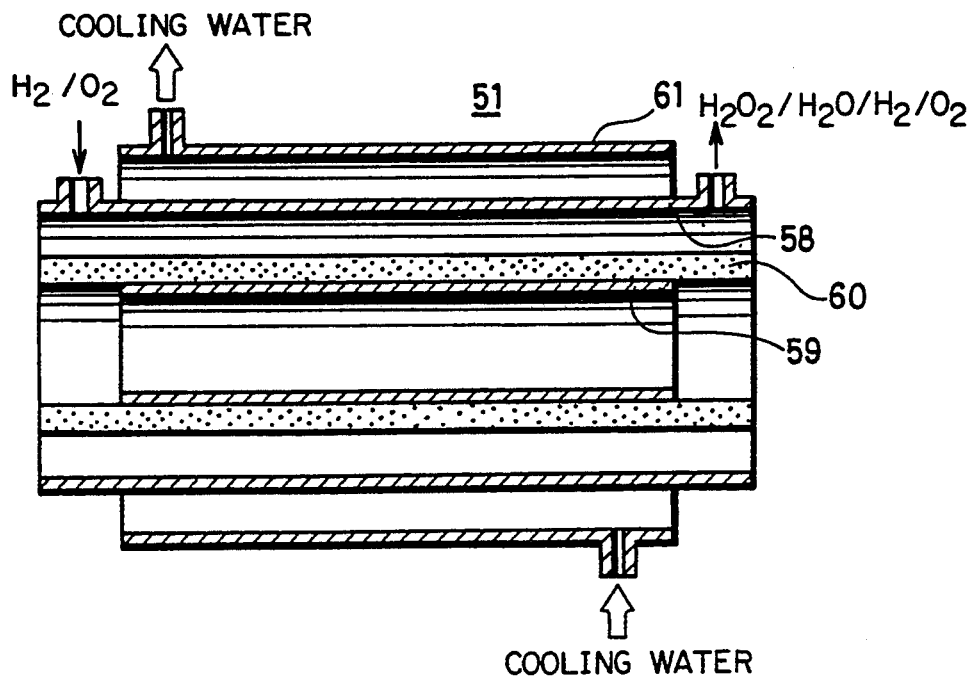
FIG. 2 is a cross sectional view showing a structure of a discharge chamber shown in FIG. 1.
Figure 3:
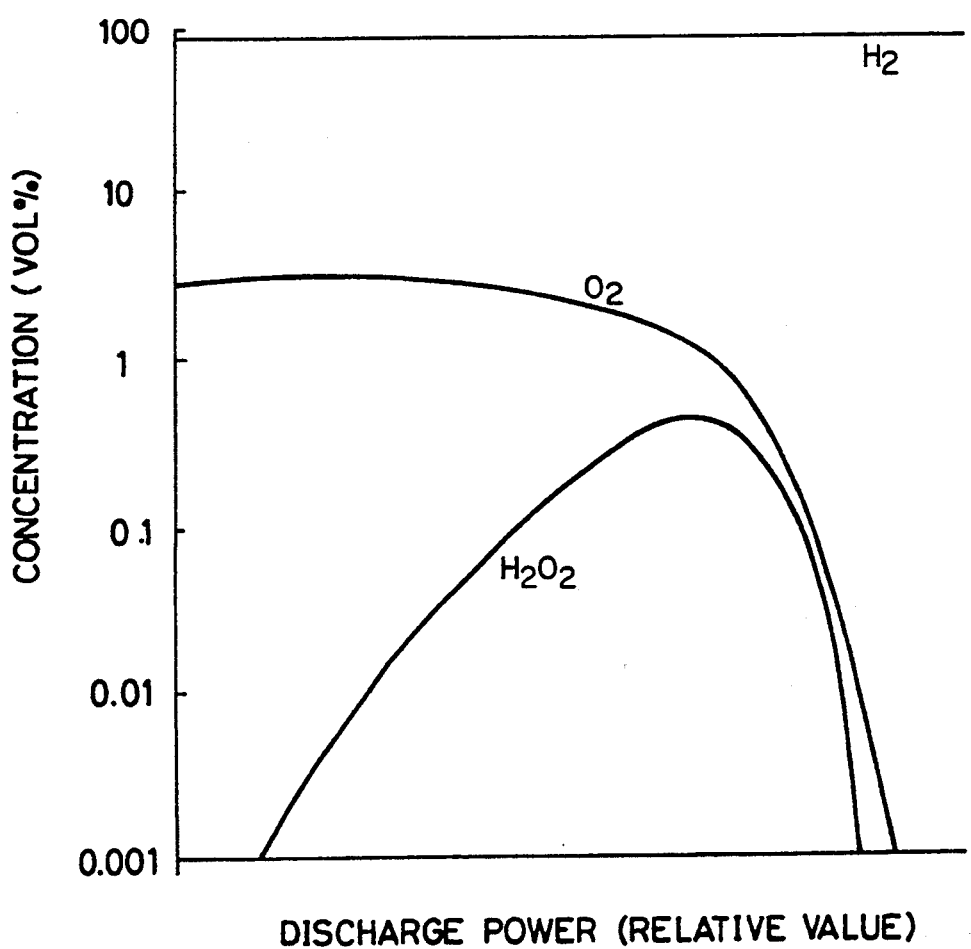
FIG. 3 is a graph showing relationship between change in concentrations of hydrogen peroxide, oxygen and hydrogen and electric discharge power in the case of producing hydrogen peroxide with a conventional apparatus for producing hydrogen peroxide.
Figure 4:
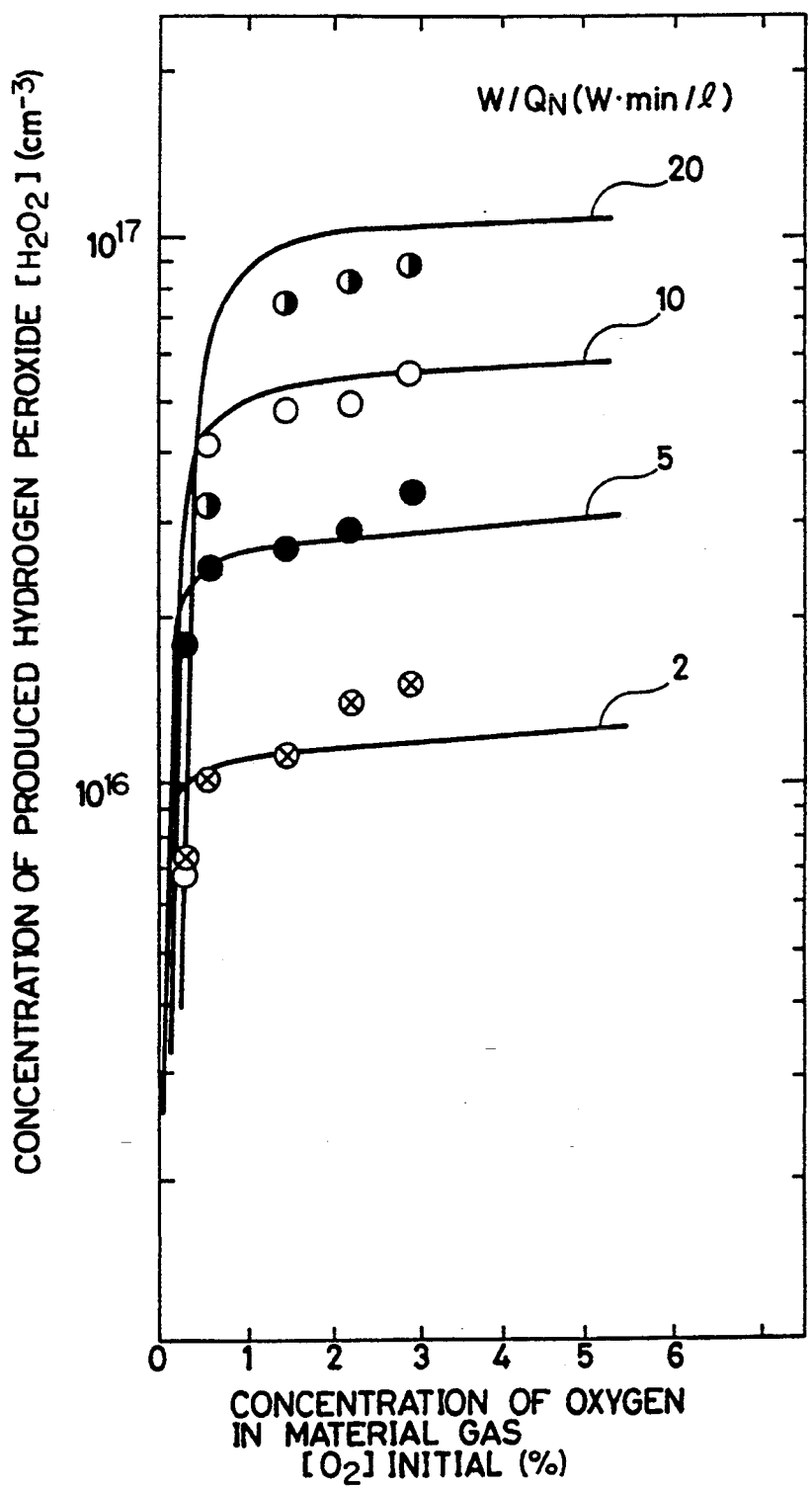
FIG. 4 is a graph showing concentration of hydrogen peroxide produced from material gas having various oxygen concentrations as the result of experiments and simulations.

FIG. 4 shows the concentration of hydrogen peroxide $[H_2O_2]$ produced with respect to the oxygen concentration [$O_2$] initial in the material gas at four stages of ratio of electrical discharge power versus flow rate, $W/Q_N$. The plots show results of the experiments, and the solid lines show the results of the simulations, respectively. The figure shows that the increase in concentration of produced hydrogen peroxide becomes calm when the oxygen concentration arrive at approximately 0.5% or more. Accordingly, when the oxygen concentration is not less than 0.5%, the concentration of produced hydrogen peroxide does not largely depend on the oxygen concentration in the material gas. That is, it is shown that supply of oxygen of approximately 0.5% or more is required for efficiently producing hydrogen peroxide, but the efficiency does not considerably change even with more oxygen supplied. Accordingly, it seems that 3% suggested in the conventional example is high in the range of oxygen concentration for producing hydrogen peroxide and also that it is not necessarily an appropriate value in view of producing hydrogen peroxide safely.

On the other hand, the simulations of reaction revealed that raw material oxygen is consumed for production of hydrogen peroxide, water and ozone, and also that excessive supply of oxygen causes the reaction to trend toward production of ozone. Not excessive oxygen results in efficient production of hydrogen peroxide, and furthermore results in safe production of hydrogen peroxide. Therefore, the most appropriate oxygen concentration was studied in view of oxygen consumption with the simulations of reaction.

Figure 5:
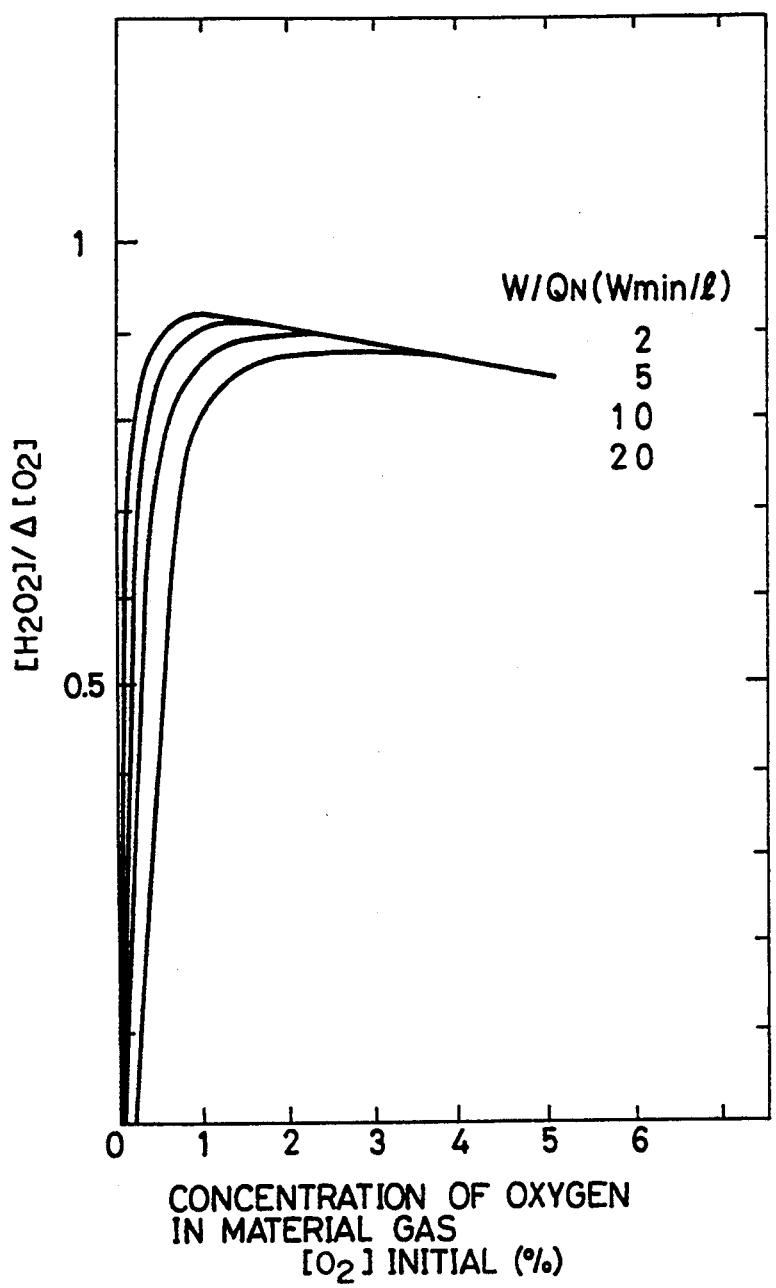
FIG. 5 is a graph showing the ratio of hydrogen peroxide with respect to the decreasing oxygen concentration $[H_2O_2]/\Delta[O_2]$, with respect to the oxygen concentration $[O_2]$ initial in a material gas as the result of simulations.

FIG. 5 shows the ratio of hydrogen peroxide concentration with respect to decreasing oxygen concentration [$H_2O_2$]/$\Delta$[$O_2$] with respect to the oxygen concentration in a material gas [$O_2$] initial. That is, it shows that as the value of the ratio of hydrogen peroxide concentration with respect to the decreasing oxygen concentration is higher, the raw material oxygen is consumed to produce hydrogen peroxide more effectively. As clearly seen from the figure, appropriate oxygen concentration shifts as the ratio of electrical discharge power versus flow rate $W/Q_N$ increases, but it is in the vicinity of approximately 0.5–3%. It is showed that the oxygen concentration in the raw material should be set in a range of approximately 0.5–3% for effective production of hydrogen peroxide. As the result of the experiments, furthermore, it was revealed clearly that the operational conditions of the oxygen concentration of no less than 3% and the ratio of electrical discharge power versus flow rate $W/Q_N$ of not less than 20 Wmin/1 cause produced hydrogen peroxide to condense in the apparatus and also interfere safe operation of the apparatus.

The condensation of hydrogen peroxide on a side surface of the electrical discharge space is likely to implement conditions in which it is difficult to maintain stable electric discharge. The condensation of hydrogen peroxide in the electric discharge space and on pipe side surfaces reduces the amount of hydrogen peroxide which can be supplied to the next step, so that it causes a trouble in process in the next step. Conventionally, the temperature of the electrical discharge space was often raised in order to prevent the condensation, but our simulations revealed that a temperature increase in the electrical discharge space decreases the efficiency of production of hydrogen peroxide. Accordingly, it is desired that reaction is caused under conditions of as temperature as close to the normal temperature as possible which does not cause condensation. On the basis of the above description, it is showed that the oxygen concentration suitable for safe reaction is less than 3%.

As described above, if the oxygen concentration in the material gas is set in the range of above 0.5% and less than 3%, hydrogen peroxide can be safely and effectively produced.

Figure 6:
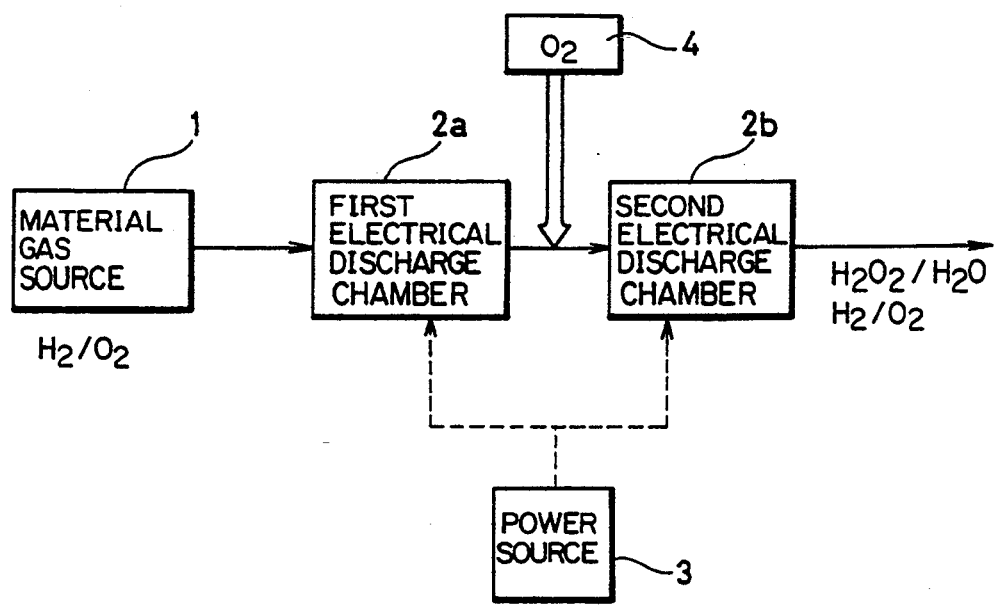
FIG. 6 is a conceptional diagram showing one embodiment of an apparatus for producing hydrogen peroxide in accordance with the present invention in the second aspect.

FIG. 6 shows one embodiment of an apparatus for producing hydrogen peroxide in accordance with the present invention in the second aspect. In this embodiment, two discharge chambers are provided. Referring to FIG. 6, in this apparatus, a material gas source 1 is connected to a first electrical discharge chamber 2a and the first electrical discharge chamber 2a is connected to a second electrical discharge chamber 2b. The first and the second electrical discharge chambers are provided with electrical power from a power source 3. An oxygen gas cylinder 4 is connected to a path for gas between first electrical discharge chamber 2a and second electrical discharge chamber 2b.

A material gas containing hydrogen and oxygen of concentration of approximately 4% or less is supplied to first discharge chamber 2a from material gas source 1, In first discharge chamber 2a, upon application of an AC high voltage from power source 3, silent discharge is produced between a pair of electrodes. When material gas containing oxygen and hydrogen is supplied to the place of silent discharge, hydrogen peroxide and water are produced from oxygen and hydrogen as stable compounds. Since excessive power supply for electrical discharge reduces efficiency of producing hydrogen peroxide due to complete consumption of oxygen, power supply is preferably restrained so that a small amount of oxygen is left. A gas containing oxygen is supplied from oxygen gas cylinder 4 to the gas containing hydrogen peroxide, water vapor, hydrogen and the small amount of oxygen exhausted from first discharge chamber 2a. The amount of supply is adjusted so that the oxygen concentration in the gas after mixing is maintained at a previously set concentration under 4% in a safe range. The gas containing oxygen with increased concentration, hydrogen, hydrogen peroxide and water vapor is guided to second discharge chamber 2b. Similarly to the case of first discharge chamber 2a, hydrogen peroxide and water vapor are further produced by silent discharge between electrodes to which the AC nigh voltage is applied from power source 3. The gas containing hydrogen peroxide with increased concentration in this way is exhausted from second discharge chamber 2b and guided to a portion where it is used.

The upper limit of the oxygen concentration shown here, that is 4% varies depending on reaction conditions as a matter of course. Especially, when the electrical discharge is produced under a pressure lower than the atmospheric pressure, the oxygen concentration at the explosion limit is higher than 4%. Accordingly, in producing hydrogen peroxide under pressure smaller than the atmospheric pressure, the oxygen concentration can be set exceeding 4%.

The amount of the gas supplied from oxygen gas cylinder 4 must be set so that the oxygen concentration in the mixed gas does not increase to or exceeding 4% in order to prevent the risk of explosion or ignition, Conversely, when the oxygen concentration is much lower than the concentration previously set, as the oxygen is completely used up in the second discharge chamber, the efficiency of producing hydrogen peroxide reduces. Accordingly, considerably low oxygen concentration must be avoided.

Figure 7:
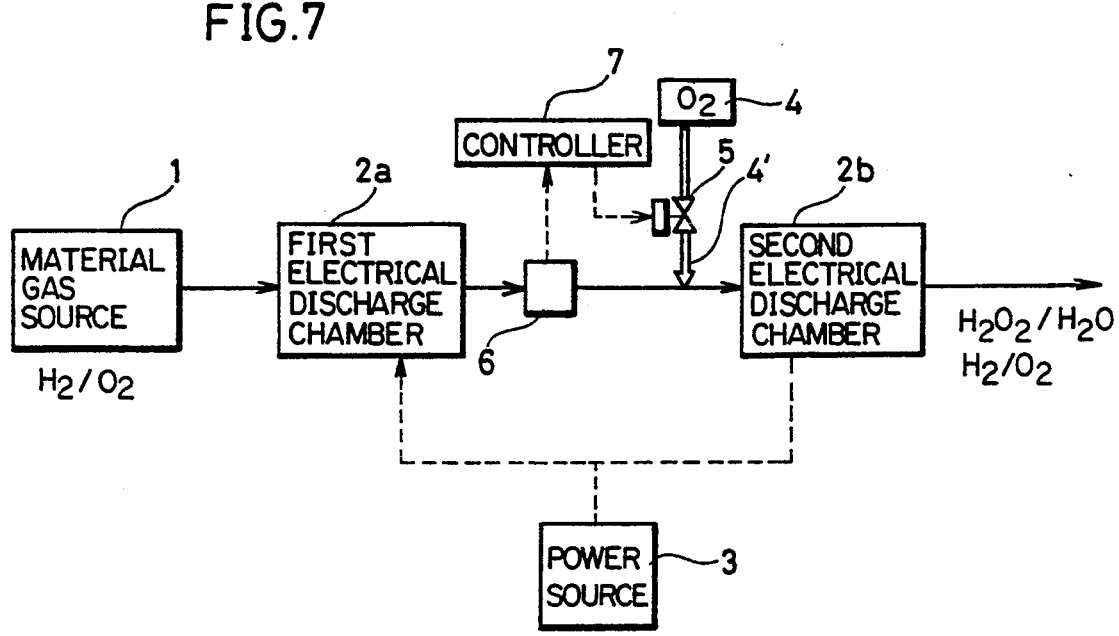
FIG. 7 is a conceptional diagram showing an improved apparatus for producing hydrogen peroxide in the second aspect of the present invention.

In the above-mentioned embodiment, a method of estimating a reduced amount of oxygen concentration from the supply power and supplying oxygen of a lucking amount can be introduced. The method, however, can not respond to the fluctuation of oxygen consumption with change of electrical discharge conditions and cooling conditions, so that it is difficult in the above embodiment to precisely set the amount of oxygen supply. The embodiment described below has an oxygen supply mechanism which can deal with the fluctuation of oxygen consumption. FIG. 7 schematically shows an improved apparatus for producing hydrogen peroxide in the second aspect of the present invention. The apparatus shown in FIG. 7, as well as the apparatus shown in FIG. 6, includes a material gas source 1, a first electrical discharge chamber 2a, a second electrical discharge chamber 2b and an oxygen gas cylinder 4. An oxygen concentration sensor 6 is provided between first discharge chamber 2a and second discharge chamber 2b. A field effect type semiconductor sensor may be employed as the oxygen concentration sensor 6, for example. A controller 7 having a microcomputer of 8 bits provided therein is connected to oxygen concentration sensor 6. A flow rate adjusting valve 5 of which open-/close is controlled by controller 7 is provided in a supply tube 4' of oxygen gas cylinder 4.

Operation of this apparatus is similar to that of the apparatus shown in FIG. 6 except for the oxygen supply mechanism. The gas containing hydrogen peroxide, water vapor, water and a small amount of oxygen exhausted from first discharge chamber 2a is first detected by oxygen concentration sensor 6 with respect to its oxygen concentration. Oxygen concentration sensor 6 transmits a signal corresponding to the oxygen concentration to controller 7. Controller 7 calculates an oxygen amount to be supplied on the basis of a difference between a previously set oxygen concentration and measured oxygen concentration, and then transmits, to flow rate adjusting valve 5, a set signal for having flow rate adjusting valve 5 supply the calculated amount of oxygen supply. The flow rate adjusting valve 5, upon receipt of the setting signal, controls amount of supplied oxygen in accordance with the signal value. The gas containing oxygen with concentration increased to a previously set value is sent to second electrical discharge chamber 2b similarly to the above embodiment in order to produce hydrogen peroxide.

As for a position at which oxygen concentration sensor 6 is provided, it should not be necessarily on the upstream side (on the first electrical discharge chamber 2a side) of a supply tube 4' of oxygen gas cylinder 4. On the contrary, locating the sensor on the downstream side (2b side) to detect the oxygen concentration in a mixed gas to which oxygen is supplied and feed-back controlling the amount to be supplied on the basis of the difference between the detected oxygen concentration and a set value can surely implement a detection of oxygen concentration at its maximum, so that the detection can be taken for avoiding the danger such as stop of apparatus for an abnormal high oxygen concentration due to a control mistake of controller 7.

A mixed gas of oxygen and hydrogen is employed as a material gas in the above two embodiments. A mixed gas in which inert gases such as helium and argon are added to the material gases can be employed. Also, the supplied gas does not necessarily have to be composed of oxygen gas only, and a mixed gas with an inert gas can sufficiently produce effects of the present invention, for example.

Furthermore, although cases having two electrical discharge chambers are described in any of the above embodiments, it is not limited to the same. If an apparatus in accordance with the present invention has three discharge chambers, oxygen may be supplied to both of second and third discharge chambers and also may be supplied to either one of second or third discharge chambers.

An apparatus having a plurality of electrical discharge chambers and a mechanism for supplying oxygen consumed by discharge as described above can effectively utilize the hydrogen gas for production of hydrogen peroxide and also can yields hydrogen peroxide with high concentration without danger of explosion or ignition.

Figure 8:
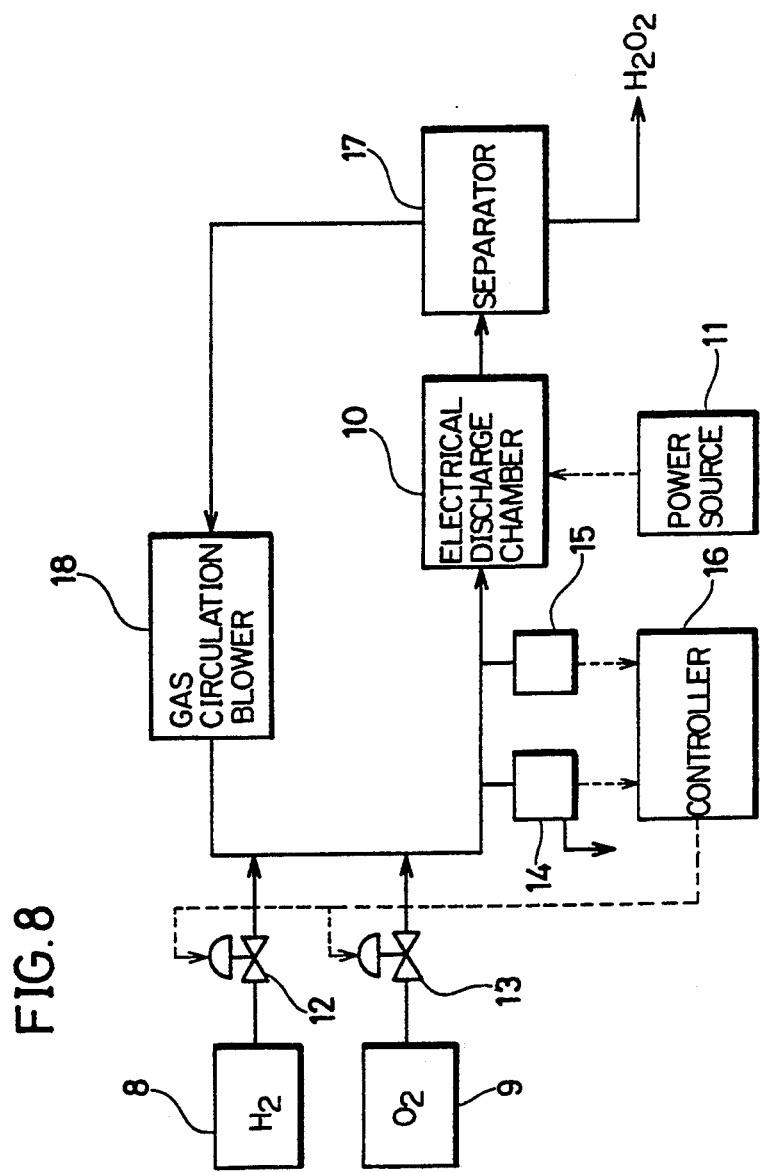
FIG. 8 is a conceptional diagram showing an apparatus for producing hydrogen peroxide in accordance with the present invention in the third aspect.

FIG. 8 shows one embodiment of the apparatus for producing hydrogen peroxide in accordance with the present invention in the third aspect. Referring to FIG. 8, an electrical discharge chamber 10 provided with a mixed gas containing hydrogen and oxygen for producing hydrogen peroxide by discharge is connected to a separator 17. The separator 17 is connected to a gas circulation blower 18 and the gas circulation blower 18 is connected to electrical discharge chamber 10. The recycling system is formed in this way. A hydrogen gas supplying source 8 and an oxygen gas supplying source 9 are connected to a gas path returning from gas circulation blower 18 to discharge chamber 10 through flow rate adjusting valves 12 and 13, respectively. An oxygen concentration detector 14 including a field effect type semiconductor sensor and a pressure detector 15 are connected to a gas passage from these supplying sources to discharge chamber 10. These detectors are electrically connected to a controller 16 including a microcomputer of 8 bits. The controller 16 is electrically connected to flow rate adjusting valves 12 and 13. The electrical discharge chamber 10 is provided with electrical power from a power source 11.

Next, operation of this apparatus will be described. Oxygen and hydrogen are supplied to discharge chamber 10 in the recycling system from gas supplying sources 8 and 9 through flow rate adjusting valves 12 and 13, respectively. The flow rates of hydrogen and oxygen are then controlled by these valves so that the oxygen concentration in the mixed gas is maintained at a set value. An AC high voltage is applied from power source 11 to discharge chamber 10 to produce silent discharge between a pair of electrodes. When a gas containing oxygen and hydrogen is supplied to the place for silent discharge, hydrogen peroxide and water vapor are produced as stable compounds. If the supply power for discharges is too large, as the oxygen is completely consumed, the production efficiency of hydrogen peroxide decreases. Accordingly, the supplied power must be limited to such an extent that a small amount of oxygen is left. The gas containing hydrogen peroxide, water vapor, hydrogen and a small amount of oxygen obtained in this way enters separator 17. When separator 17 is formed as a duplex tube, for example, a mixed gas is passed through the interior tube and cooling brine is passed between the interior tube and the exterior tube, and a large part of hydrogen peroxide and a part of water vapor in the mixed gas are condensed and separated. The gas exhausted from separator 17 in which a large part of hydrogen peroxide and a part of vapor are removed is pressurized by gas circulation blower 18 to be recycled as a material gas to electrical discharge chamber 10. The recovered gas lacks oxygen and hydrogen for producing hydrogen peroxide because of separation of hydrogen peroxide and vapor. Accordingly, oxygen and hydrogen are supplied to the recovered gas from material gas supplying sources 8 and 9, respectively. The supplied amounts of oxygen and hydrogen depend on the amounts of hydrogen peroxide and water vapor taken out as a condensate. As for the supplied amount, from the oxygen concentration measured by oxygen concentration detector 14 and the pressure measured by pressure detector 15, for example, with the following expressions (1) and (2), each of the supply rate is calculated.

$$QO_2 = \frac{(P_0 \times C_0 - P \times C) \times V}{\Delta t} \quad (1)$$

$$QH_2 = \frac{(P_0 - P) \times V}{\Delta t} - QO_2 \quad (2)$$

In the expressions, $QO_2$, $QH_2$, $P_0$, P, $C_0$, C, v and $\Delta t$ indicate oxygen supply flow rate, hydrogen supply flow rate, set pressure, measured pressure, set oxygen concentration, measured oxygen concentration, space volume of the recycling system and time constant, respectively.

The oxygen concentration detector 14, as shown in FIG. 8, may be provided branching from the recycling system including electrical discharge chamber 10, separator 17 and gas circulation blower 18 connected, or may be provided in the recycling system. Especially, if oxygen concentration detector 14 is provided into the recycling system, a material gas can be effectively utilized without leaking outside.

Setting of supplied amounts of oxygen and hydrogen may be made by other methods. The other methods include a method of determining supplied amounts of oxygen and hydrogen from the quantity of the condensate and concentration of hydrogen peroxide or water in the condensate.

Figure 9:
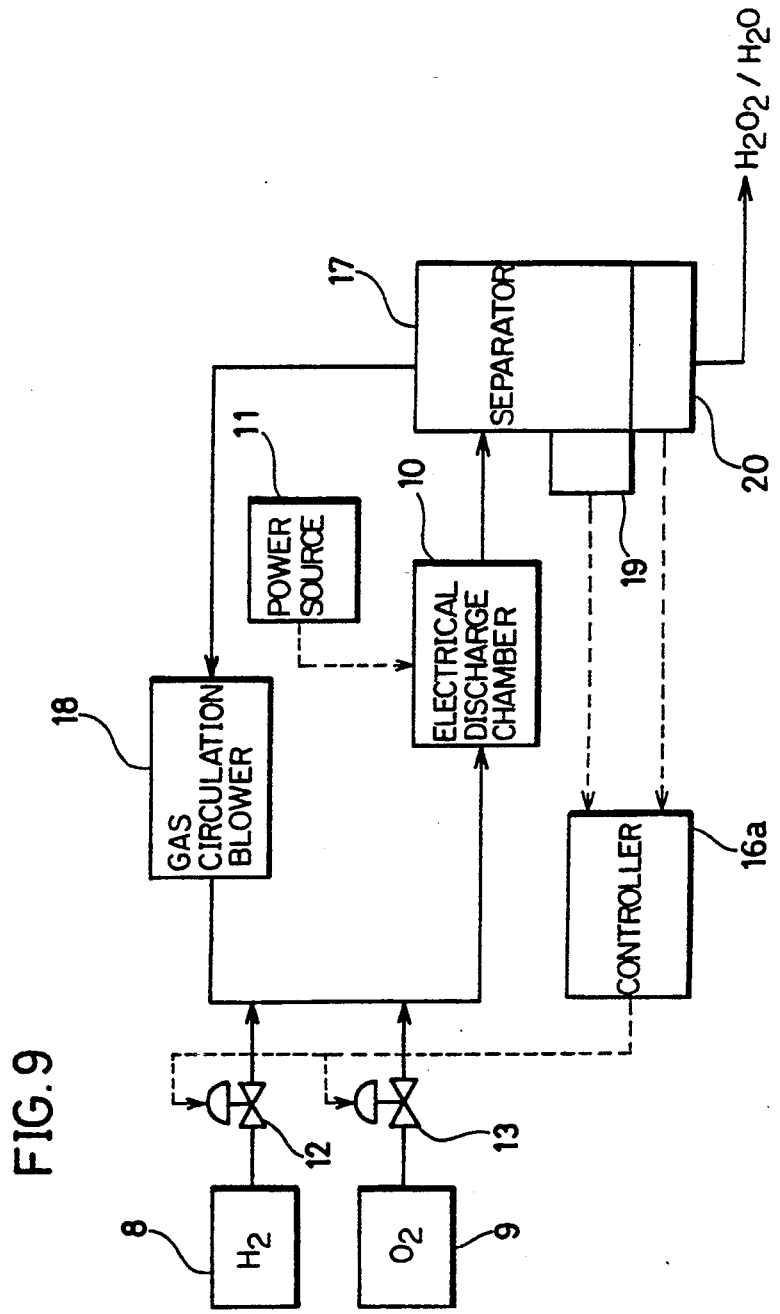
FIG. 9 is a conceptional diagram showing an apparatus for producing hydrogen peroxide having a mechanism for determining the amounts of oxygen and hydrogen to be supplied after measuring the amount of separated hydrogen peroxide, in the third aspect.

FIG. 9 schematically shows a hydrogen peroxide producing apparatus having a mechanism for determining supplied amounts of oxygen and hydrogen from the quantity of condensate and hydrogen peroxide concentration in the condensate. This apparatus is configured of parts equivalent to those in FIG. 8 except for a mechanism for determining supply amounts. In a trap of separator 20, a level gage 19 is provided and an ultraviolet absorptiometer 20 is provided in a bottom portion of the trap. A method of setting the quantities of supply of oxygen and hydrogen will be described below. An increase in the amount of the condensate is obtained from a measured value of the level gage. The accumulating velocity of the condensate (L: g/min) is obtained from a product of an increasing velocity of a value indicated by the level gage ($\Delta h/\Delta t$) and an area of a section of the trap (S) in accordance with expression (3).

$$L = \frac{\Delta h \times S \times \rho}{\Delta t} \quad (3)$$

In the expression, ρ denotes the density of the condensate which is a function of the hydrogen peroxide concentration and temperature. The accumulation velocity of hydrogen peroxide can be calculated if the hydrogen peroxide concentration (CH: g/cm³) is simultaneously measured. Accordingly, the quantities of oxygen and hydrogen removed as condensate can be expressed as expressions (4), (5).

$$QH_2 = \frac{CH \times 2}{34} + \frac{(\rho - CH) \times 2}{18} \times L \times 22.4 \quad (4)$$

$$QO_2 = \frac{CH \times 2}{34} + \frac{(\rho - CH) \times 16}{18} \times L \times 22.4 \quad (5)$$

In the expressions, $QH_2$, $QO_2$ indicate consumptions (1/min) of oxygen and hydrogen, respectively. With oxygen and hydrogen of the quantities obtained as $QH_2$, $QO_2$ supplied, the pressure and the oxygen concentration in the recycling system are maintained at values set in advance.

The apparatus of recycling a gas exhausted from the separator and supplying oxygen and hydrogen to the recovered gas as described above increases the utilization factor of the raw material hydrogen. Also, while recycling the gas, by appropriately detecting the quantities of oxygen and hydrogen consumed by production of hydrogen peroxide and water and then supplying oxygen and hydrogen to the recovered gas in accordance with the detected information, the oxygen concentration in the material gas can be maintained at a predetermined value. Accordingly, the dangers of explosion and ignition can be avoided.

Figure 10:
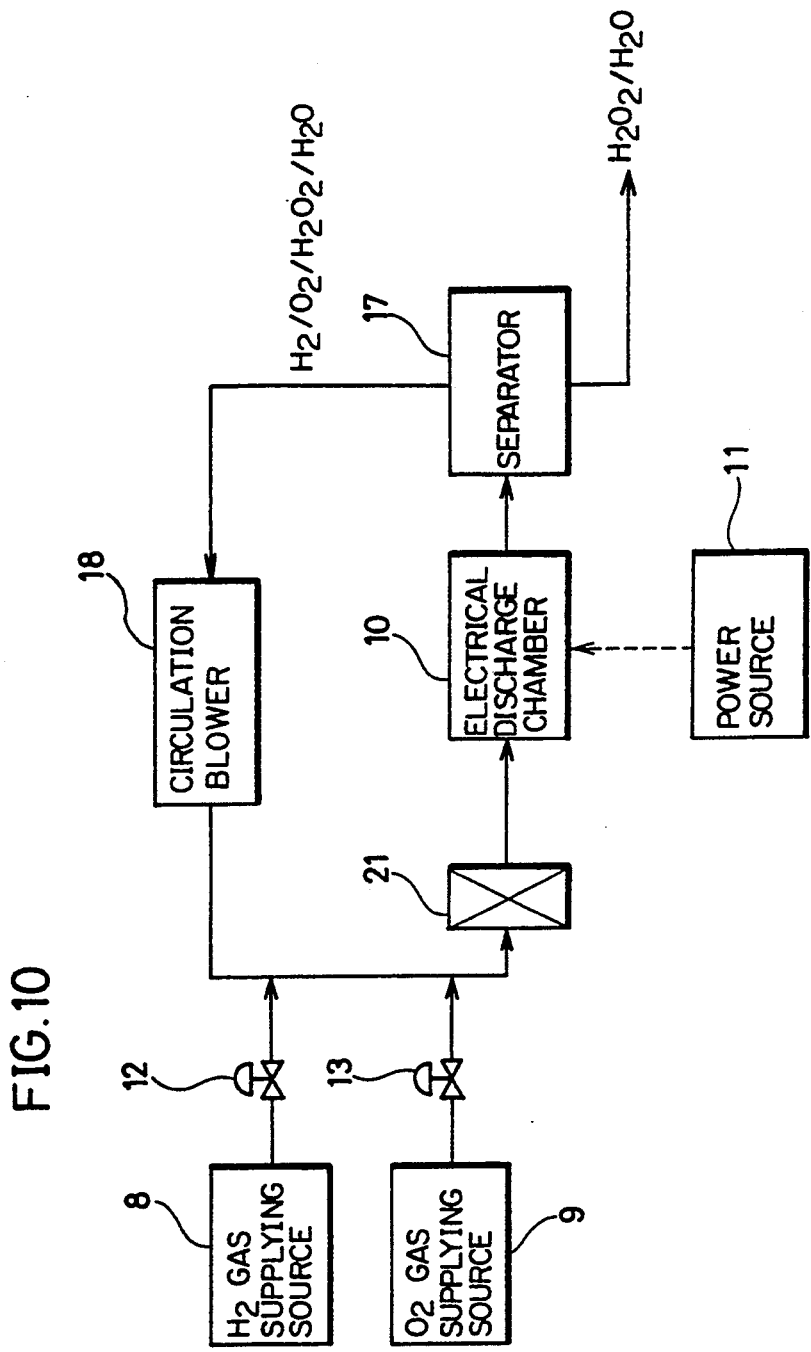
FIG. 10 is a conceptional diagram showing one embodiment having a filter for holding particles of impurity in an apparatus for producing hydrogen peroxide in accordance with the present invention in the third aspect.

FIG. 10 shows another embodiment of the apparatus for producing hydrogen peroxide in accordance with the present invention in the third aspect. In this embodiment, a gas filter is provided in a path for introducing gas into the electrical discharge chamber. Referring to FIG. 10, similarly to the apparatus in FIGS. 8 and 9, a recycling system is formed having an electrical discharge chamber 10, a separator 17 and a circulation blower 18. Silent discharge are produced in discharge chamber 10 with electric power from a power source 11. A hydrogen gas supplying source 8 is connected to a path of recovered gas from gas circulation blower 18 to electrical discharge chamber 10 through a gas-flow rate adjusting valve 12, and an oxygen gas supplying source 9 is also connected thereto through a gas flow rate adjusting valve 13. Also, in the passage of recovered gas, a gas filter 21 having a bore diameter of 0.05–1.0 μm is provided just in front of discharge chamber 10.

Oxygen and hydrogen gases are supplied from material gas supplying sources 8 and 9 into the recycling system with their flow rates controlled by valves 12 and 13. The mixed gas with oxygen concentration controlled at set value is first supplied to discharge chamber 10.

An AC high voltage is applied from power source 11 to discharge chamber 10 to produce silent discharge between a pair of electrodes. When the gas containing oxygen and hydrogen is supplied to the place of silent discharge, hydrogen peroxide and water vapor are produced as stable compounds. The mixed gas containing obtained hydrogen peroxide, water vapor, hydrogen and a small amount of oxygen enters separator 17 having a structure described above. The gas in which a large part of hydrogen peroxide and a part of water vapor are removed by separator 17 contains hydrogen, oxygen and a small amount of water vapor. The gas is pressurized by gas circulation blower 18, supplied with oxygen and hydrogen, and then returned to discharge chamber 10 as material gas.

Figure 11:
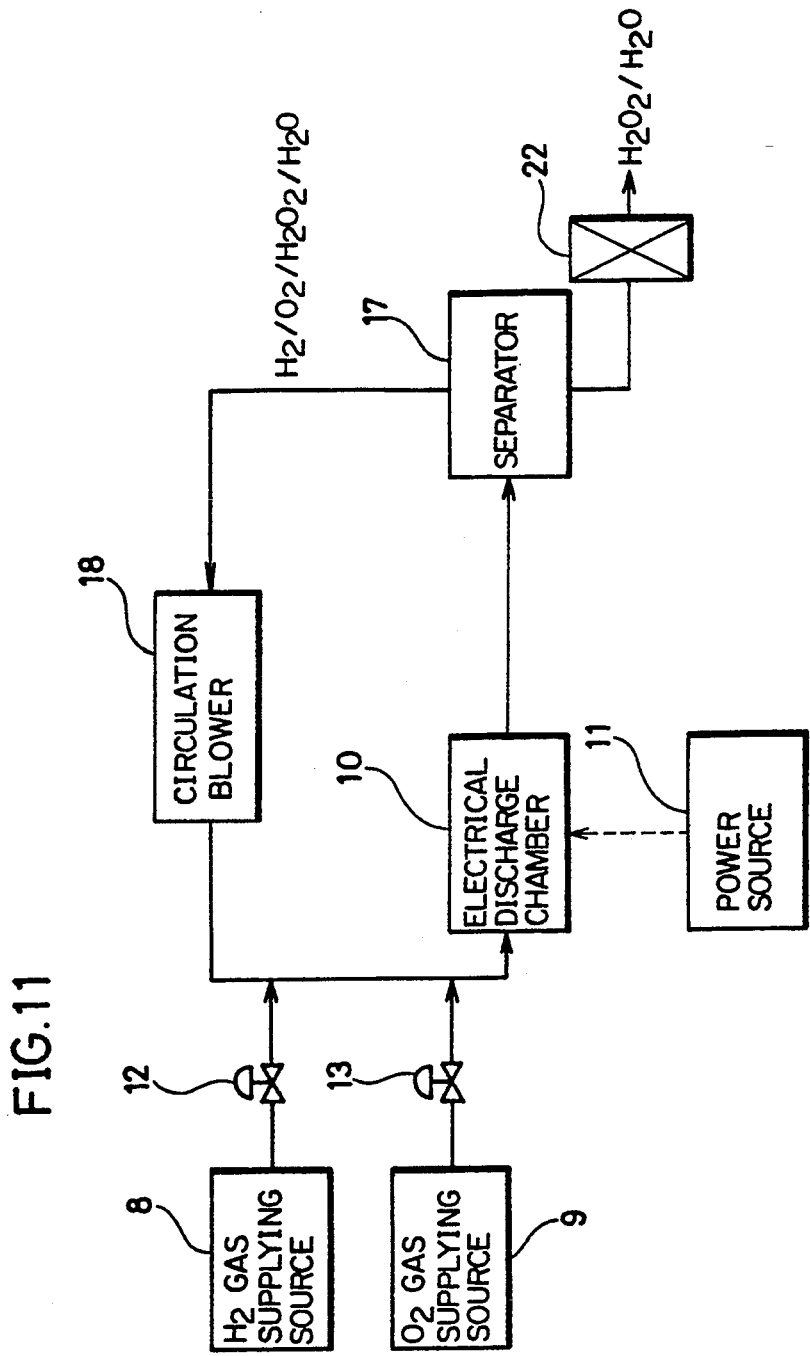
FIG. 11 is a conceptional diagram showing another embodiment having a filter in the apparatus for producing hydrogen peroxide in the third aspect.

Particles produced as the result of collision of electrons or produced material gas ions against electrodes in discharge chamber 10 for spattering electrode materials, particles produced due to wear of movable portions of gas circulation blower 18, and particles containing oxide of various kinds of materials formed by reaction between interior walls of the gas circulation path and hydrogen peroxide may be included in the recovered gas recycled in this way. The gas filter 21 holds these particles to prevent the particles from contaminating produced hydrogen peroxide. Also, in order to prevent contamination of the aqueous solution of hydrogen peroxide by the particles, as shown in FIG. 11, a filter 22 may be provided in a passage for taking out hydrogen peroxide and water from separator 17.

Figure 12:
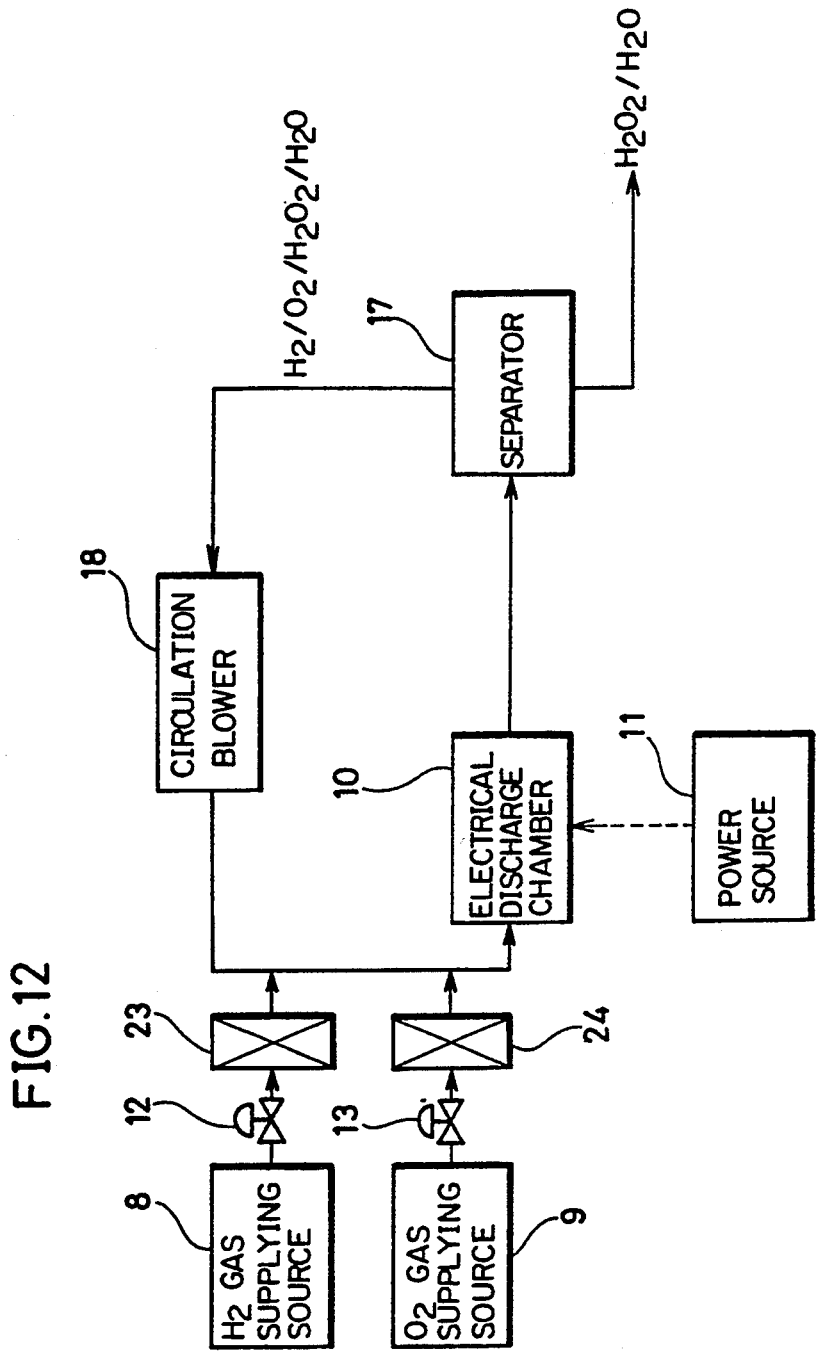
FIG. 12 is a conceptional diagram showing one embodiment having a filter for holding impurity particles from a gas supply source in the apparatus of the present invention in the third aspect.

Furthermore, if gas cylinders are employed as material gas supplying sources 8 and 9, particles of metal oxide from interior surfaces of the gas cylinder often contaminate the material gas even if normalcy of the gas in the gas cylinder is sufficiently controlled. Such impurity particles are separated and removed by gas filter 21 provided in a gas introducing portion of discharge chamber 10 as shown in FIG. 10, and also may be removed by filters 23 and 24 respectively provided in the passage respectively connected to the recycling system of gas supplying sources 8 and 9 as shown in FIG. 12. To hold the impurities by such filters as described above produces clean hydrogen peroxide solution as a product.

In the gas flowing in the recycling system, hydrogen peroxide is contained, although there is a $H_2O_2$ concentration variation among portions. Accordingly, materials of filter 21 provided in the recycling system are preferably ones which do not react with hydrogen peroxide. Tetrafluoroethylene resin is one of such desired materials.

The bore diameter of filter 21 is selected depending on a portion at which it is used, expected sizes of impurity particles, and the life time of the filter. When producing hydrogen peroxide for a semiconductor manufacturing process, a bore diameter of 0.05–1.0 $\mu$m is especially desirable.

As a specific example of filter 21 satisfying the above conditions, a membrane filter (with a bore diameter of 0.1–0.2 $\mu$m) produced by TOYO ROSHI KABUSHIKI KAISHA is pointed out.

In any of embodiments shown in FIGS. 10 through 12, only one filter is provided at a necessary portion, but it is not limited to these embodiments, and two or more filters may be provided at necessary portions.

Figure 13:
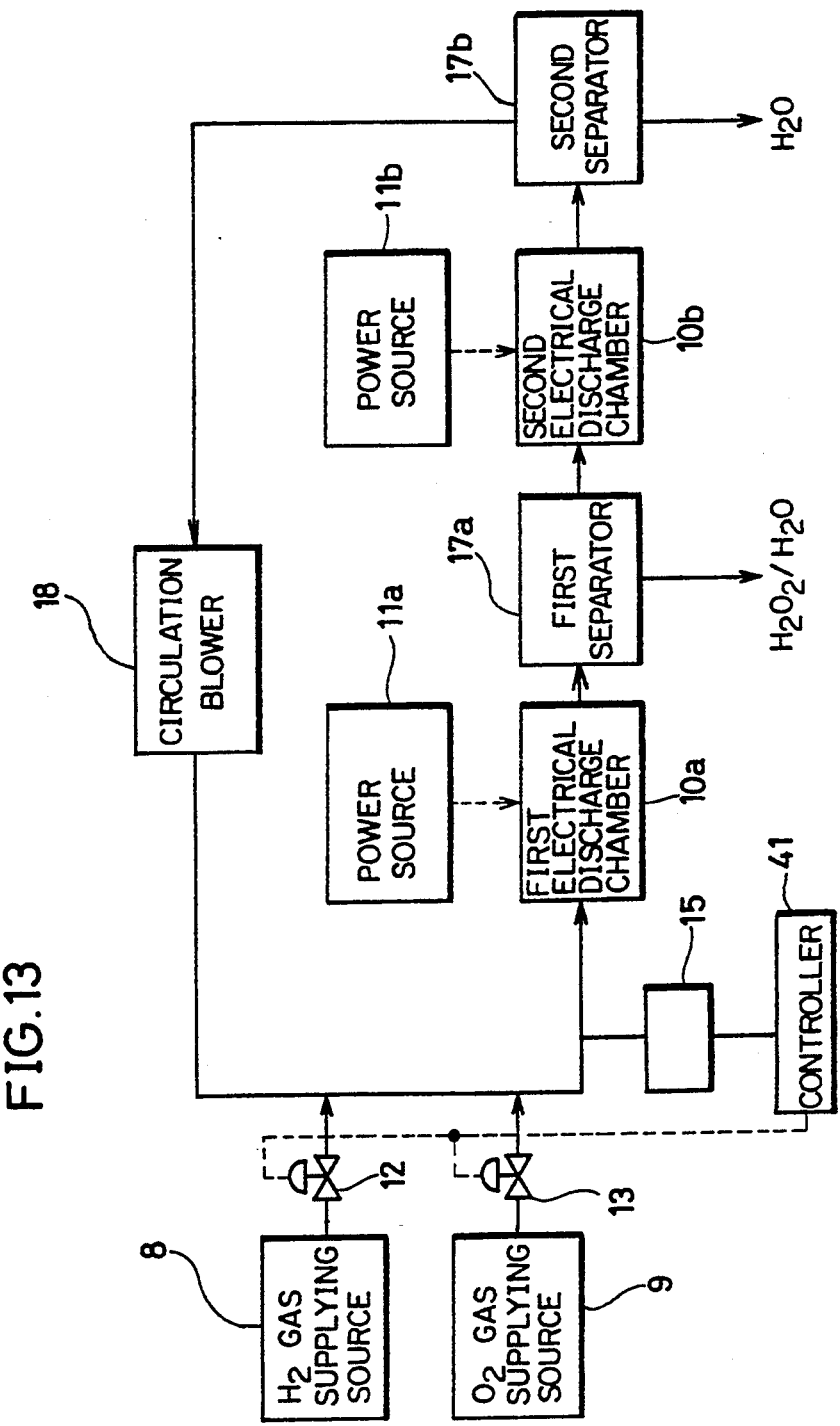
FIG. 13 is a conceptional diagram showing an apparatus in which the recycling system further includes a second discharge chamber and a second separator in the apparatus of the present invention in the third aspect.

Furthermore, in accordance with the present invention in the third aspect, an apparatus for producing hydrogen peroxide as shown in FIG. 13 may be provided. Referring to FIG. 13, a first electrical discharge chamber 10a to which electric power is supplied from power source 11a is connected to a first separator 17a. The first separator 17a is connected to a second electrical discharge chamber 10b to which electrical power is supplied from power source 11b. The second discharge chamber 10b is connected to a second separator 17b. The second separator 17b is connected to the first discharge chamber 10a through a gas circulation blower 18. A recycling system having two electrical discharge chambers, two separators and a gas circulation blower is formed as shown in the figure. A hydrogen gas supplying source 8 and an oxygen gas supplying source 9 are connected to a path of gas returning from gas circulation blower 18 to discharge chamber 10a through flow rate adjusting valves 12 and 13, respectively. A pressure detector 15 is connected to a passage of gas from these supplying sources to discharge chamber 10a. The pressure detector is electrically connected to a controller 41 having a microcomputer of 8 bits. The controller 41 is electrically connected to flow rate adjusting valves 12 and 13.

The operation of this apparatus will be described below. Oxygen and hydrogen are supplied to electrical discharge chamber 10a in the recirculation system from gas supply sources 8 and 9 through flow rate adjusting valves 12 and 13, respectively. The amounts of supply of hydrogen and oxygen are then controlled by these valves so that the concentrations of oxygen and hydrogen in the mixed gas are maintained at set values (oxygen 3%, hydrogen 97%, for example). The mixed gas with oxygen concentration maintained at a set value in this way is first sent to first electrical discharge chamber 10a. An AC high voltage is applied from power source 11a to the discharge chamber 10a to produce silent discharge between a pair of electrodes. When a gas containing oxygen and hydrogen is supplied to the place for silent discharge, hydrogen peroxide and water vapor are produced as stable compounds. If the supplied power from power source 11a for discharges is too large, oxygen is completely used up, resulting in a decrease in production efficiency of hydrogen peroxide. Accordingly, the supplied power should be limited to such extent as a little amount of oxygen still remain (e.g., 1%). The gas containing hydrogen peroxide, water vapor, water and a small amount of oxygen obtained in this way enters separator 17a. When separator 17a is formed as a duplex tube, for example, a mixed gas is passed through the interior tube and cooling brine is passed between the interior tube and the exterior tube, where a large part of hydrogen peroxide and a part of water vapor in the mixed gas are condensed and separated. The gas exhausted from separator 17a in which a large part of hydrogen peroxide and a part of water vapor are removed is sent to second discharge chamber 10b. High electrical power sufficient to completely consume oxygen contained in the introduced gas is applied to second discharge chamber 10b from power source 11b. Accordingly, while no hydrogen peroxide is produced, a mixed gas of hydrogen and water vapor which is only stable product is produced in second discharge chamber 10b. The mixed gas of hydrogen and vapor enters second separator 17b. In the gas within second separator 17b, almost all of the water vapor is condensed and separated with cooling. The gas containing hydrogen and just a small amount of water vapor exhausted from second separator 17b is pressurized by gas circulation blower 18 and returned to first discharge chamber 10a. In the recovered gas, almost all of oxygen and a part of hydrogen have been consumed in producing hydrogen peroxide and water vapor. Accordingly, oxygen and hydrogen are supplied from gas supplying sources 8 and 9, respectively. The quantities of supply are determined only with the flow rate of the returned gas, previously set concentration, and the pressure in the recycling system. One example of methods for determining the quantities of supply will be shown below.

It is assumed that pressure detector 15 detects a pressure value $P_M$. With the pressure set by control device 41, the flow rate of circulated gas, and oxygen concentration denoted as $P_0$, $Q_0$ and $CO_2$, and the space volume of the recycling system as V, the quantity of supply of hydrogen QH₂ and the quantity of supply of oxygen QO₂ are expressed as the following expressions.

$$QH_2 = (P_0 - P_M) \times V \times (1 - CO_2)/\Delta t$$

$$Q_0 \times CO_2$$

By controlling flow rate adjusting valves 41 and 42 according to these expressions, a mixed gas is reorganized having a desired composition.

In order to remove water vapor in the recovered gas as much as possible, the cooling temperature of second separator 17b is preferably decreased. It is desirable to cause condensation in a temperature range so that the water vapor does not turn into ice, however, so that the cooled temperature of second separator 17b is preferably not more than 10° C. and not less than −5° C.

In the above-mentioned apparatus, since almost no oxygen is contained in the gas exhausted from the second separator, the quantities of hydrogen and oxygen supply can be controlled only by measuring the pressure of the recovered gas. As described above, since a parameter to be measured are simple, without using complicated operation means, the quantities of oxygen and hydrogen supply are easily controlled. Furthermore, the gas exhausted from the second separator contains almost only hydrogen and just a little amount of oxygen. Such a gas is in smaller danger of explosion or ignition. Accordingly, in the apparatus shown in FIG. 13, the safety of the recycling system is enhanced.

Figure 14:
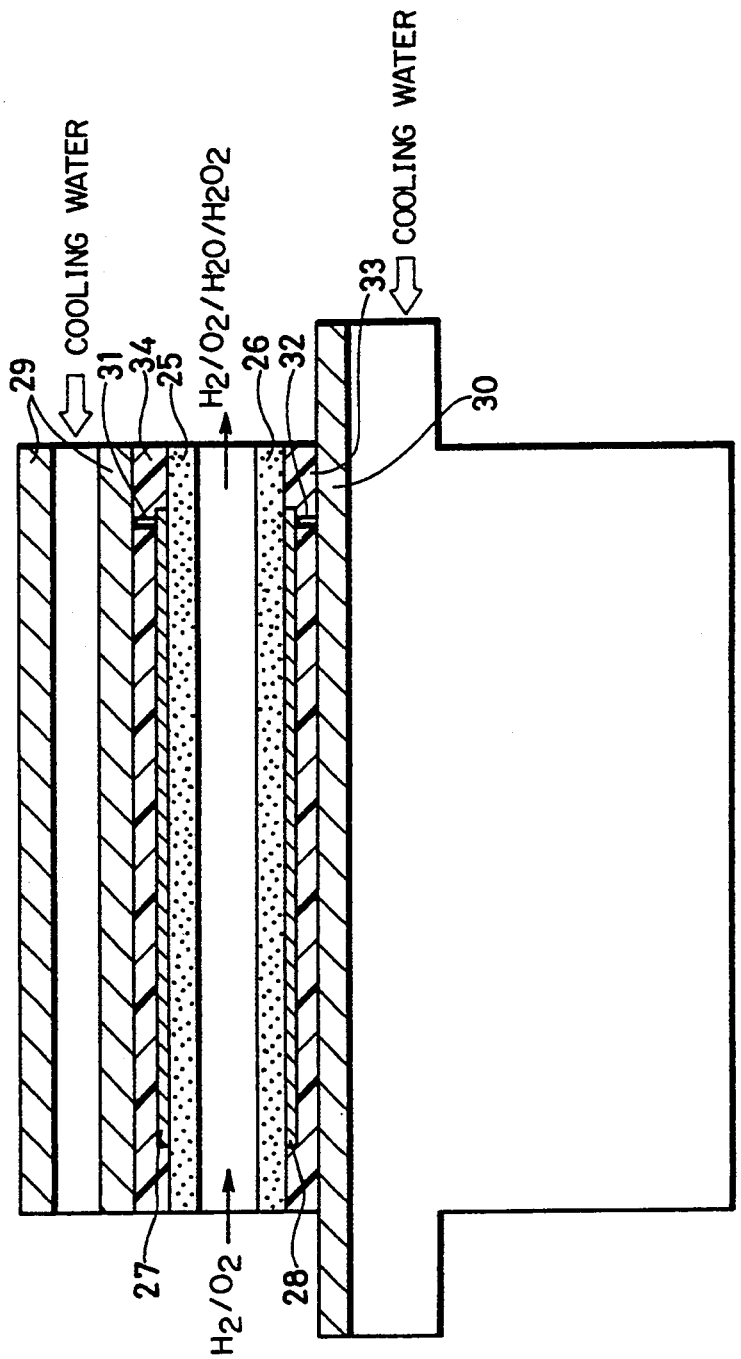
FIG. 14 is a cross sectional view showing a main portion for discharge in one embodiment of the present invention in the fourth aspect.

One specific example of the present invention in the fourth aspect will be described below referring to the figure. Referring to FIG. 14, this figure is a sectional view showing a main portion of an electrical discharge chamber in the apparatus for producing hydrogen peroxide. A pair of dielectrics 25 and 26 are provided on opposing surfaces of a pair of electrodes 27 and 28 for producing electrical discharge, respectively. The pair of electrodes 27 and 28 are thin film electrodes. The thin film can be formed of a metal thin film of such as aluminum, copper or nickel, and also can be formed by applying silver paste or gold epoxy or the like. Dielectrics 25 and 26 can be formed of quartz, ceramics, glass or the like. The outer surfaces of the pair of electrodes 27 and 28 are covered with thermal conductive resin 33 and 34. On the surfaces of thermal conductive resin 33 and 34 opposite to the electrodes, metallic cooling members 29 and 30 are provided, respectively. Feeders 31 and 32 are also electrically connected to the pair of electrodes 27 and 28, respectively. The pair of resins 33 and 34 have electrical insulating property and also have excellent thermal conductivity. Resins 33 and 34 are formed of silicone resin, for example.

Operation of an apparatus configured as described above will be described below. A material gas containing oxygen and hydrogen is supplied in a space between dielectrics 25 and 26. An AC high voltage is applied between the electrodes 27 and 28 from the power source through metallic cooling members 29 and 30, and feeders 31 and 32, respectively. Silent discharge is induced between electrodes 27 and 28 to which the voltage is applied. Upon supply of a gas containing oxygen and hydrogen in the place of silent discharge, hydrogen peroxide and water are produced as stable compounds.

The energy used only for producing intermediate products in reaction for producing hydrogen peroxide and water is only 15% of the energy supplied by electrical discharge. Besides, when hydrogen peroxide and water are produced from the intermediate products, heat is generated. That is, a considerable part of the energy supplied by electrical discharge is released into the electrical discharge space as thermal energy. Accordingly, the temperature of the gas in the discharge place becomes extremely high. The production efficiency of hydrogen peroxide largely depends on the temperature of gas in the discharge place. Generally, the lower the temperature of the gas is, the higher the production efficiency is. Accordingly, cooling in the place of discharge is essential to implement high efficiency. In the apparatus shown in FIG. 14, metallic cooling members 29 and 30 are cooled by water or a cooling agent. Since the resins 33 and 34 in contact with metallic cooling members 29 and 30 respectively have good thermal conductivity, so that the electrodes 27 and 28 covered with the resin are quickly cooled by cooling these members 29 and 30. Cooling of electrodes 27 and 28 is effective for producing hydrogen peroxide with high efficiency.

On the other hand, if the electrodes for discharge are exposed in the place of discharge, it is difficult to produce clean hydrogen peroxide. If the metallic electrode is exposed in the place of discharge, particles or ions of metal produced by collision of electrons and particles of metallic oxide produced by reaction between metal and active oxygen atoms will contaminate the gas. When the produced hydrogen peroxide is used in a process of manufacturing precise devices such as semiconductors, these ions and particles will reduce the yield of manufactured devices. Accordingly, covering opposing surfaces of a pair of electrodes 27 and 28 with dielectrics 25 and 26 respectively is very effective for preventing production of such ions and particles. Such dielectrics 25 and 26, however, are weak in shock, so that consideration should be given to the safety of devices in the case of damage of these dielectrics. If dielectrics 25 and 26 are directly cooled with water, effective cooling will be implemented. If the dielectrics 25 and 26 are broken when the dielectrics are directly cooled with water, however, a gas mainly containing hydrogen having danger of explosion will leak out of the apparatus through the cooling water.

In the apparatus shown in FIG. 14, resin 33 and 34 are filled between dielectric 25 and metallic cooling member 29 and between dielectric 26 and metallic cooling member 30, so that dielectrics 25 and 26 are not likely to be damaged easily. Even if the dielectric is broken, since the system of the cooling agent and the passage of material gas are separated by the resin, the dangerous gas mainly containing hydrogen is prevented from leaking. Furthermore, even when dielectrics 25 and 26 and metallic cooling members 29 and 30 are processed with low precision to have unevenness, the unevenness can be filled with resin 33 and 34.

As described above, in the apparatus for producing hydrogen peroxide in accordance with the present invention in the fourth aspect, generation of particles and ions of metal electrodes and oxide particles of the metal electrode component can be prevented and also the electrodes can be safely and effectively cooled.

Figure 15:
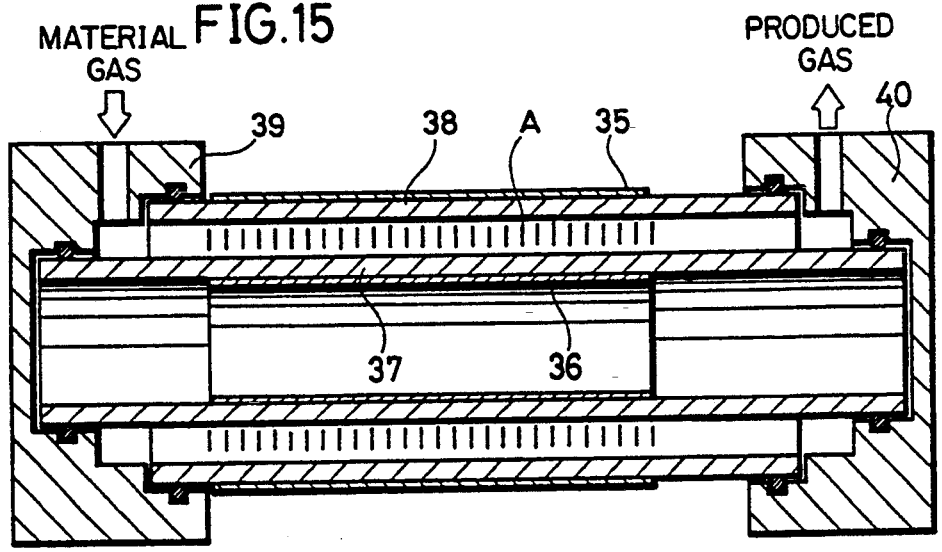
FIG. 15 is a cross sectional view showing one embodiment of a discharge chamber of the apparatus for producing hydrogen peroxide in accordance with the fifth aspect of the present invention.

FIG. 15 shows one specific example of an apparatus for implementing the present invention in the fifth aspect. Referring to FIG. 15, dielectrics 35 and 36 are provided on surfaces opposing to each other of a pair of metal electrodes 35 and 36, respectively. The dielectric is formed of quartz. The pair of electrodes 35 and 36 face to each other at intervals of not more than several mm. The dielectrics 35 and 36 are supported by supporting members 39 and 40 formed of fluororesin, respectively. A material gas is passed in the direction of the arrow in the figure. The portion in which the line A is drawn indicates a space surrounded by electrodes, that is an electrical discharge space. On a portion of the dielectrics which are located on the downstream side of material gas, electrodes are not provided. The space surrounded only by the dielectrics is a non-electrical discharge space.

A material gas containing oxygen and hydrogen is supplied into the apparatus in the direction of the arrow in the figure. Upon application of an AC high voltage to the pair of the electrodes, silent discharge is produced between the pair of electrodes with the dielectrics provided therebetween. When a gas containing oxygen and hydrogen is supplied to the place for silent discharge, hydrogen peroxide and water are produced as stable compounds. In using the produced hydrogen peroxide as a gas, the gas exhausted from the apparatus is transported as it is to a place where it is used. When hydrogen peroxide is employed in a solution, the gas containing hydrogen peroxide, water, hydrogen and a small amount of oxygen exhausted from the apparatus is transported to a separator. In the separator, a large part of hydrogen peroxide and a part of water in the gas are cooled to be condensed and separated. In the place for electrical discharge, spattering of quartz materials by electrons did not occur at all. Furthermore, in the non-electrical discharge space, inactivation of radical species containing oxygen atoms and hydrogen atoms occurs, so that generation of unnecessary products originated in the radical species is restrained. By changing the flow rate of the material gas and/or the size of the non-electrical discharge space, the time period in which the gas stays in the non-electrical discharge space can be made 1 msec or more. Generally, the life time (half-life) of radical species is approximately several 10 $\mu$sec under conditions in which the pressure of gas in the place of discharge is equal to the atmospheric pressure or more, so that almost no radical species remain after the stay of the gas for 1 msec. Accordingly, generation of unnecessary products due to reaction between the radical species and materials of the apparatus can be sufficiently prevented.

When supplying the hydrogen peroxide produced in a place of electrical discharge to a place where it is used as it is, the inner surface of a passage through which the hydrogen peroxide is transported are preferably formed of materials which do not react with hydrogen peroxide or do not react readily with it, such as fluorine type resin, quartz and silicone resin.

Figure 16:
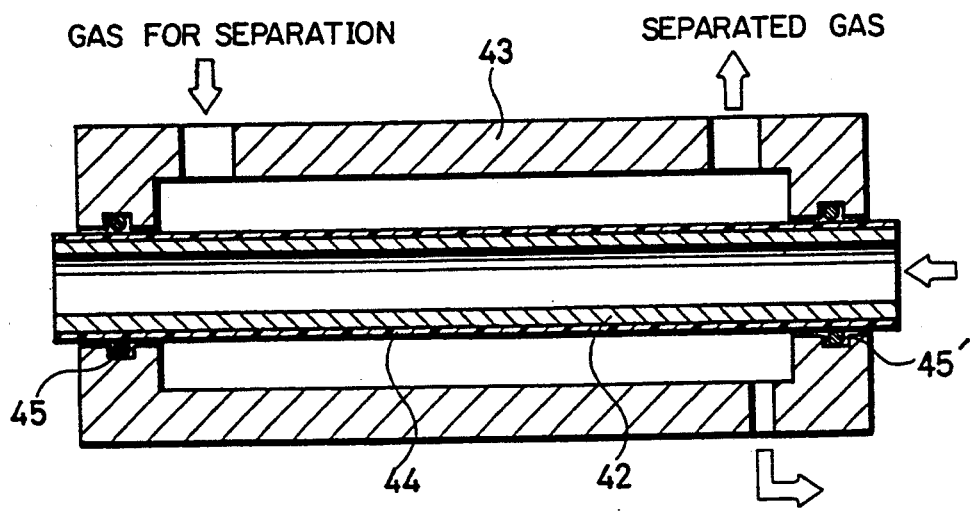
FIG. 16 is a cross sectional view showing one specific example of a condensation tube of the apparatus for producing hydrogen peroxide in accordance with the present invention in the sixth aspect.

Referring to the figure, one specific example of the present invention in the sixth aspect will be described below. Referring to FIG. 16, the figure shows a structure of a condensation tube which is an important portion of the apparatus for producing hydrogen peroxide in accordance with the present invention. This condensation tube has a structure in which a metal tube 42 formed of metal (e.g. copper, aluminum and stainless steel) is provided in an exterior tube 43 formed of glass. On an outer surface of metal tube 42, coating 44 formed of tetrafluoroethylene resin is formed. The metal tube 42 having coating 44 and the exterior tube 43 are in close contact with each other through rings 45, 45' at two points as shown in the figure. Rings 45, 45' is formed of tetrafluoroethylene resin or silicone resin, for example.

Hydrogen peroxide is produced by electrical discharge of a commonly used discharger (not shown) in a material gas containing oxygen and hydrogen. Then, a gas containing hydrogen peroxide and water is exhausted from the discharger. The gas containing hydrogen peroxide and water is introduced into a separator and then cooled and condensed by the condensation tube provided in the separator. In the separator, it is required to separate hydrogen peroxide with high efficiency. The efficiency considerably depends on the thermal conductivity of the condensation tube. In the condensation tube, aqueous solution of hydrogen peroxide with high concentration condenses on surfaces for condensation, so that the surfaces in the tube must have resistance to hydrogen peroxide. Furthermore, the gas flowing in the condensation tube mainly contains hydrogen which is inflammable, so that the condensation tube must be tough. In the condensation tube shown in FIG. 16, the outer surface of metal tube 42 on which hydrogen peroxide is condensed is coated with tetrafluoroethylene resin having small reactivity with hydrogen peroxide. Accordingly, the surface of the condensation tube is not corroded by hydrogen peroxide. With cooling brine flowing in metal tube 42, the condensation tube is effectively cooled. With a gas containing hydrogen peroxide and water passed in the direction of the arrow shown in the figure, hydrogen peroxide and water are effectively cooled and condensed. In this way, hydrogen peroxide is effectively separated. Furthermore, the metal tube for cooling is excellent in mechanical strength.

In covering the surface of metal tube 42 with tetrafluoroethylene resin 44, the property of tetrafluoroethylene resin that it shrinks with heat was utilized. That is, when covering, after inserting metal tube 42 into a tube of tetrafluoroethylene resin a little bit larger than metal tube 40, the resin tube was heated. With shrinkage of the resin tube, a coating of tetrafluoroethylene resin 44 was easily formed on the peripheral surface of metal tube 42.

A quartz tube may be employed for the metal tube. In this case, an outer surface of the quartz tube is coated with resin having small reactivity with hydrogen peroxide such as tetrafluoroethylene resin. Since the quartz has high corrosion resistance with respect to hydrogen peroxide, it can provide a condensation tube more excellent in corrosion resistance. The quartz tube is weak to mechanical impact, but with resin coating, it is strengthen. Even if the quartz tube is broken, the resin coating prevents the gas from going out of the system through a cooling agent during a short time until supply of gas mainly containing hydrogen is stopped. In this way, employing the quartz tube instead of a metal tube, the condensation tube can be provided having impact resistance and corrosion resistance to hydrogen peroxide and also capable of cooling and condensing hydrogen peroxide and water efficiently.

When providing a resin coating on a surface of the quartz tube, in order to prevent a gas or cooling brine from leaking when the quartz tube is broken, a surface for condensation is preferably provided on the side of fluid with higher pressure. That is, if the pressure of the cooling brine is higher than the pressure of the gas, the surface on which resin is formed is preferably used as a surface for condensation, and conversely, in an opposite case, the surface formed of quartz is preferably used as a surface for condensation. It is more desirable to coat an interior surface and an exterior surface of the quartz tube with resin.

Figure 17:
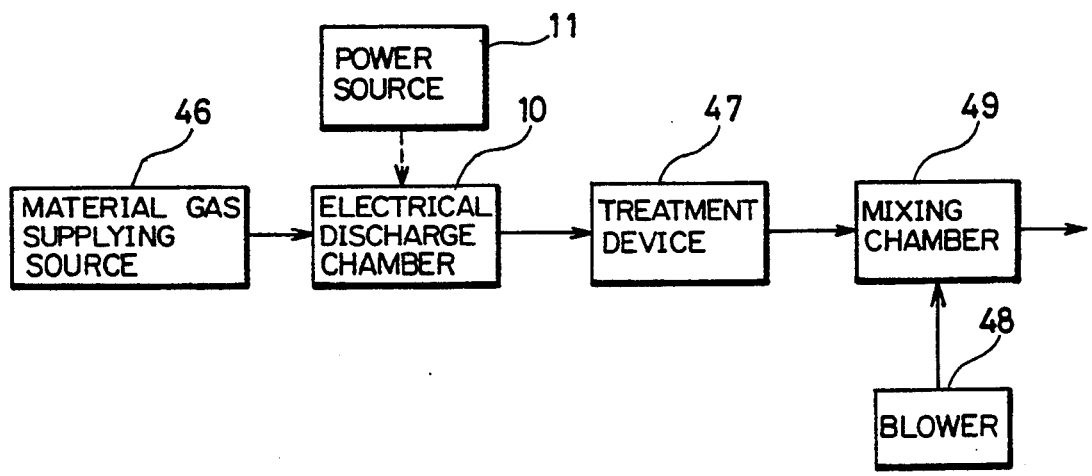
FIG. 17 is a conceptional diagram showing one specific example of the apparatus for treating exhaust gas in accordance with the present invention in the seventh aspect.

FIG. 17 is a conceptional diagram of one embodiment in the seventh aspect of the present invention. Referring to FIG. 17, a material gas containing oxygen and hydrogen is supplied to an electrical discharge chamber 10 from a material gas supplying source 46. An AC high voltage is applied to discharge chamber 10 from a power source 1i to induce electrical discharge between electrodes of the discharge chamber. Upon supply of the gas containing oxygen and hydrogen to the place for discharge, hydrogen peroxide and water are produced as stable compounds. The gas containing hydrogen peroxide, water vapor, hydrogen and a small amount of oxygen obtained in this way enters a treatment device 47. In the treatment device 47, an objective to be treated utilizing oxidation or addition reaction with hydrogen peroxide is located. Almost all the hydrogen peroxide in the gas supplied to treatment device 47 disappears in the objective reaction. The gas in which a large part of hydrogen peroxide has been consumed must be exhausted out of the system as an exhaust gas. In the embodiment shown in FIG. 17, the gas to be exhausted out of the system is transported to a mixing chamber 49. Simultaneously, a large quantity of air is sent to the mixing chamber 49 by a blower 48. The exhausted gas and the air are mixed in mixing chamber 49. As a result, the hydrogen contained in the exhausted gas at concentration not less than 95% is diluted to the smallest value of concentration at which explosion may not occur, that is 4%, in a short time and exhausted out of the system. The gas containing hydrogen of high concentration exhausted from treatment device 47 by an apparatus provided with mixing chamber 49 and blower 48 is diluted with a large amount of air. The gas having the danger of explosion is turned into a safe gas after passing through the mixing chamber. Accordingly, the dangerous property of the exhaust gas can be easily avoided.

In the above-described embodiment, a system of directly supplying the gas obtained in electrical discharge chamber 10 to treatment device 47 was shown, but a system employing a condenser for changing the hydrogen peroxide into a form of aqueous solution can be configured according to the present invention. In this case, a gas in which a large part of hydrogen peroxide and a part of water vapor are condensed and separated by a condenser, is transported to mixing chamber 49.

As described above, according to the present invention in the seventh aspect, accidental explosion in a gas exhausting passage can be prevented beforehand.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for producing hydrogen peroxide from a material gas containing hydrogen and oxygen, comprising:
   an electrical discharge chamber provided with said material gas for producing hydrogen peroxide from said material gas by electrical discharge;
   a separator for separating hydrogen peroxide and water from gas exhausted from said electrical discharge chamber;
   recycling means for returning gas exhausted from said separator to said electrical discharge chamber;
   hydrogen supplying means for supplying hydrogen to the recycled gas recycled from said separator to said electrical discharge chamber by said recycling means;
   oxygen supplying means for supplying oxygen to the recycled gas recycled from said separator to said electrical discharge chamber by said recycling means;
   detecting means for at least measuring a quantity of oxygen consumed by the production of hydrogen peroxide; and
   control means for controlling a quantity of hydrogen supply from said hydrogen supplying means and a quantity of oxygen supply from said oxygen supplying means in accordance with information from said detecting means.

2. The apparatus according to claim 1, wherein said detecting means comprises,
   an oxygen detector for determining oxygen concentration of said recycled gas, and
   a pressure detector for determining pressure of said recycled gas.

3. The apparatus according to claim 1, wherein said detecting means comprises hydrogen peroxide detecting means for determining a quantity of hydrogen peroxide separated by said separator.

4. The apparatus according to claim 3, wherein said hydrogen peroxide detecting means comprises,
   a level gauge for determining a quantity of liquid containing hydrogen peroxide separated by said separator, and
   an ultraviolet absorptiometer for determining hydrogen peroxide concentration in said liquid.

5. The apparatus for producing hydrogen peroxide according to claim 1, wherein said recycling means comprises a gas circulation blower.

6. The apparatus for producing hydrogen peroxide according to claim 1, further comprising a filter for removing impurity particles produced by electrical discharge in said electrical discharge chamber.

7. The apparatus for producing hydrogen peroxide according to claim 6, wherein said filter comprises a filter for removing impurity particles in said recycled gas.

8. The apparatus for producing hydrogen peroxide according to claim 6, wherein said filter comprises a filter for removing impurity particles from hydrogen peroxide separated by said separator.

9. The apparatus for producing hydrogen peroxide according to claim 6, wherein said filter comprises a filter having a bore diameter of 0.05–1.0 $\mu$m.

10. The apparatus for producing hydrogen peroxide according to claim 6, wherein said filter is formed of resin which does not react with hydrogen peroxide.

11. The apparatus for producing hydrogen peroxide according to claim 1, further comprising:
    a filter for removing impurity particles from said hydrogen supplying means; and
    a filter for removing impurity particles from said oxygen supplying means.

12. The apparatus for producing hydrogen peroxide according to claim 1, wherein said recycling means comprises, a second electrical discharge chamber for converting oxygen in the gas exhausted from said separator by discharge into water; and a second separator for separating water from gas exhausted from said second electrical discharge chamber.

13. The apparatus for producing hydrogen peroxide according to claim 12, further comprising:

pressure detecting means for determining pressure of gas returned from said second separator to said first electrical discharge chamber; and control means for controlling a quantity of hydrogen supply from said hydrogen supplying means and a quantity of oxygen supply from said oxygen supplying means in accordance with information from said pressure detecting means.

14. An apparatus for producing hydrogen peroxide by electrical discharge from material gas containing hydrogen and oxygen, comprising:

an electrical discharge chamber provided with material gas containing hydrogen and oxygen for producing hydrogen peroxide from said material gas by electrical discharge, wherein said electrical discharge chamber includes a pair of electrodes for inducing electrical discharge, dielectric consisting essentially of quartz provided respectively on opposing surfaces of said pair of electrodes, thermal conductive resin covering said pair of electrodes, and a metallic cooling member provided on said thermal conductive resin for cooling said pair of electrodes;

a separator for separating hydrogen peroxide and water from gas exhausted from said electrical discharge chamber;.

recycling means for returning gas exhausted from said separator to said electrical discharge chamber;

hydrogen supplying means for supplying hydrogen to the recycled gas recycled from said separator to said electrical discharge chamber by said recycling means;

oxygen supplying means for supplying oxygen to the recycled gas recycled from said separator to said electrical discharge chamber by said recycling means;

detecting means for at least measuring a quantity of oxygen consumed by the production of hydrogen peroxide; and control means for controlling a quantity of hydrogen supply from said hydrogen supplying means and a quantity of oxygen supply from said oxygen supplying means in accordance with information from said detecting means.

15. The apparatus according to claim 14, wherein said metallic cooling member is cooled by water or a cooling agent.

16. The apparatus according to claim 14, further comprising a space continuing from said electrical discharge chamber, in which electrical discharge is not induced, which space is covered with dielectric consisting essentially of quartz for eliminating radical species produced by said electrical discharge by maintaining therein the gas subjected to said discharge for 1 msec or longer.

17. The apparatus according to claim 14, wherein said separator comprises a condensation tube for condensing hydrogen peroxide and water from the gas exhausted from said electrical discharge chamber, said condensation tube including a structural body in which a resin film which does not react with or has a low reactivity with hydrogen peroxide is coated with metal or quartz.

18. The apparatus according to claim 17, wherein said resin film is substantially formed of tetrafluoroethylene resin.

19. The apparatus according to claim 1, further comprising a device for, after producing hydrogen peroxide by electrical discharge from a mixture gas containing hydrogen and oxygen, treating gas exhausted out of the system, wherein the device includes a mixing chamber for mixing exhaust gas and air, and means for supplying the air to said mixing chamber.

* * * * *